United States Patent Office 3,518,234
Patented June 30, 1970

3,518,234
NOVEL AROMATIC POLYAMIDE IMINES, NOVEL N-ARYL SUBSTITUTED POLYBENZIMIDAZOLES DERIVED THEREFROM AND PROCESSES FOR PREPARATION THEREOF
Shigeyoshi Hara, Masao Senoo, Moriya Uchida, Tsunemasa Yoshida, and Yoshio Imai, Tokyo, Japan, assignors to Teijin Limited, Osaka, Japan, a corporation of Japan
No Drawing. Filed May 27, 1968, Ser. No. 732,037
Int. Cl. C08g 20/32
U.S. Cl. 260—78         14 Claims

ABSTRACT OF THE DISCLOSURE

A process for preparing a polyamide imine and a heat-stable polybenzimidazole which comprises reacting an aromatic triamine such as 2,4-diaminodiphenylamine or an aromatic tetramine such as 1,3-dianilino-4,6-diaminobenzene with an aromatic dicarboxylic halide in an inert organic liquid medium to form the polyamide imine, and heating or chemically treating said polyamide imine to convert it into a polybenzimidazole. Said polyamide imine is soluble in a normal organic solvent, and said polybenzimidazole is a mouldable and also soluble in a normal organic solvent.

---

This invention relates to novel aromatic polyamide imines, novel N-aryl substituted polybenzimidazoles derived therefrom, and to processes for the preparation thereof.

It has been known to obtain linear high-molecular-weight polyamides by polycondensation between aromatic diamines and dicarboxylic acid halides. When, however, aromatic polyamines having at least 3 primary and/or secondary amino groups are used instead of the diamines, solvent-soluble high-molecular-weight polymers cannot be obtained by reaction of such polyamides and dicarboxylic acid halides, but usually cross-linked, solvent-insoluble polymers are obtained.

For instance, a polymer prepared by reacting 4,4′-diamino-diphenylamine of the following formula

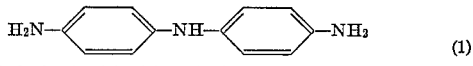
(1)

with isophthaloyl chloride of the following formula

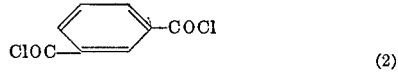
(2)

is not soluble in any solvent, and apparently contains a cross-linked structure. The reason is that not only the two primary amino groups but also the secondary amino group (—NH—) of the 4,4′-diaminodiphenylamine is reactive with the isophthaloyl chloride. The reactivity of the secondary amino group (—NH—) of 4,4′-diaminodiphenylamine with an aromatic dicarboxylic acid chloride can be easily seen from the following reaction Formula 1 where the reaction of diphenylamine with benzoyl chloride gives N-benzoyldiphenylamine (Ann. 132, 166 (1864) and Ann. 244, 12, Anm. (1884)).

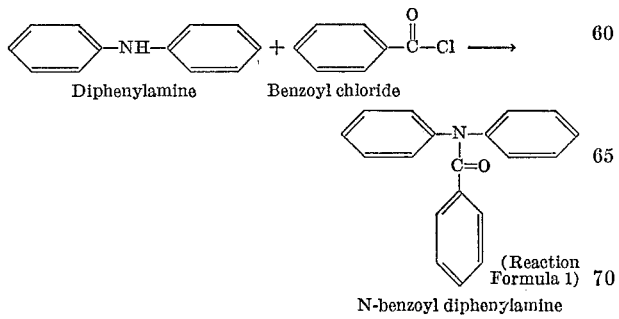

(Reaction Formula 1)
N-benzoyl diphenylamine

The reaction of 4-aminodiphenylamine with benzoyl chloride gives N,N′-dibenzoyl-p-aminodiphenylamine in accordance with the following reaction Formula 2 (Ber. 35, 1971 (1902)).

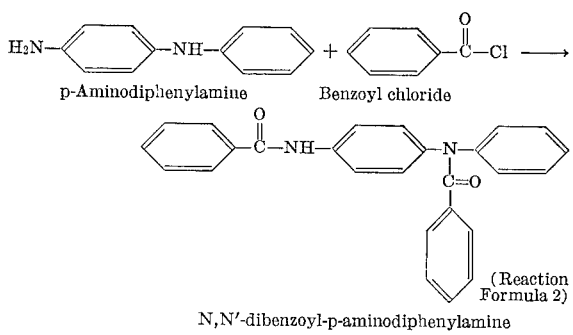

(Reaction Formula 2)
N,N′-dibenzoyl-p-aminodiphenylamine

A previous example of reaction of an aromatic tetramine with a dicarboxylic acid dihalide with a view to obtaining a precursor of polybenzimidazole is found in H. Vogel and C. S. Marvel, "Journal of Polymer Science," 50, 528 (1961) where 3,3′-diaminobenzidine or 1,2,4,5-tetraaminobenzene and an aromatic dicarboxylic acid chloride are subjected to interfacial polycondensation.

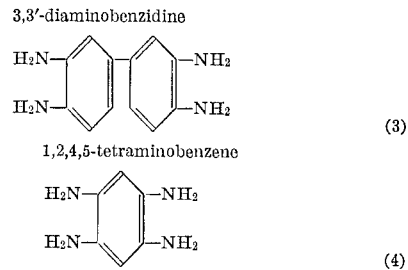

This example gave polyamide amines of rather low molecular weight whose inherent viscosities measured at 0.2% polymer concentration in sulfuric acid ranges from 0.09 to 0.22. These polyamide amines were soluble only in sulfuric acid and insoluble in any organic solvent, even when the inherent viscosity of the polymers was so low as 0.09.

Our researches have revealed however that a polyamide imine (to be referred to as aromatic polyamide imine hereinafter) wherein at least 75 mol percent of the entire structural unit is composed of at least one aromatic amide imine unit expressed by the following general formula

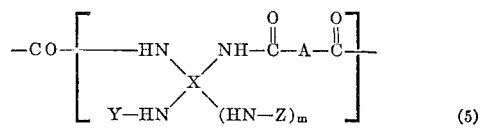
(5)

wherein X is a trivalent or tetravalent atomatic group; Y and Z are the same or different and represent a monovalent aromatic group; each of —NH—Y and (NH—Z)$_m$ is bonded to a nuclear carbon atom adjacent to each of nuclear carbon atoms to which two carboimino groups

are attached, with the proviso that said —NH—Y and ⟨NH—Z⟩$_m$ groups as well as said two carboimino groups are bonded to nuclear carbon atoms at positions other than the adjacent positions of said aromatic group, and that two carboimino groups and two groups, —NH—Y and ⟨NH—Z⟩$_m$ should not be adjacent to one another in the order of

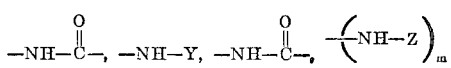

and $m$ is 0 or 1, and when $m$ is 0, $-(NH-Z)_m$ represents a hydrogen atom which may be substituted with a halogen atom or a nonreactive atomic group such as an alkyl group, is soluble in amide-type organic solvents such as N,N-dimethylacetamide, N,N-dimethyl formamide, 1-methyl-2-pyrrolidone, 1,5-dimethyl-2-pyrrolidone and hexamethyl phosphoramide or an ordinary organic solvent such as dimethyl sulfoxide, epsilon-caprolactam and m-cresol, even when it has a high molecular weight suitable for shaping into films and other articles, and therefore it is easy to fabricate. It has also been found that this aromatic polyamide imine is easily cyclo-dehydrated by application of heat, and gives an N-aryl substituted polybenzimidazole which is very stable to heat and chemicals.

The aromatic polyamide imine of the invention can be prepared, for instance, by polycondensing a specific aromatic triamine or tetramine (A) with an aromatic dicarboxylic acid dihalide (C) in an inert organic liquid medium. In this case, a modified polymer may be obtained by replacing 25 mol percent or more of said triamine or tetramine with an aromatic diamine (B).

Now, the preparation of the aromatic polyamide imine of the invention will be described in more detail.

According to the invention, the aromatic polyamide imine is produced by reacting at least one aromatic triamine or tetramine (A) of the following formula

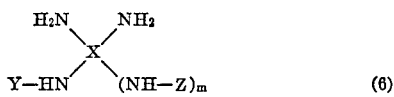

(6)

wherein X is a trivalent or tetravalent aromatic group; Y and Z are the same or different and represent a monovalent aromatic group; each of —NH—Y and

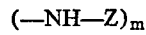

is bonded to a nuclear carbon atom adjacent to each of nuclear carbon atoms to which two primary amino groups (—NH₂) are attached, with the proviso that said —NH—Y and $-(NH-Z)_m$ groups as well as said two primary amino groups are bonded to nuclear carbon atoms at positions other than the adjacent positions of said aromatic groups, and that two primary amino groups and two groups, —NH—Y and $-(NH-Z)_m$ should not be adjacent to one another in the order of —NH₂, —NH—Y, —NH₂—, $-(NH-Z)_m$; and $m$ is 0 or 1, and when $m$ is 0, $-(NH-Z)_m$ is a hydrogen atom which may be substituted with a halogen atom or a non-reactive atomic group such as an alkyl group, or a mixture of at least 75 mol percent of the said aromatic triamine or tetramine with less than 25 mol percent of an aromatic diamine having primary amino groups and/or monoalkyl-substituted amino groups which are attached to nuclear carbon atoms at positions other than adjacent positions or peri positions, with at least one aromatic dicarboxylic acid dihalide expressed by the general formula HalOC—A—COHal (7)

wherein Hal is a halogen atom, A is a divalent aromatic group, and two —COHal groups should not be at adjacent or peri positions to the aromatic nucleus of A, in an inert organic liquid medium (C).

The peri position used in this specification and claims means the peri position of a naphthalene nucleus and a position corresponding to the peri position of naphthalene nucleus of a cyclic compound having a structure analogous to a naphthalene nucleus.

By reacting the aromatic triamine or tetramine (A) in which one or two N-aryl substituted secondary amino groups are attached to the primary amino groups at adjacent positions to the nuclear carbon atoms of the aromatic nucleus, with the aromatic dicarboxylic acid dihalide (C), said secondary amino groups do not react with carbonyl halide of the aromatic dicarboxylic acid dihalide, and therefore, a substantially linear aromatic polyamide imine containing the secondary amino groups in their original form will be formed. It is for this reason that this aromatic polyamide imine is soluble in many organic solvents. Furthermore, by application of heat, etc., to such aromatic polyamide imine, it is possible to induce a cyclo-dehydration reaction between the secondary amino groups and the carboimino groups. Consequently, more thermally and chemically stable polybenzimidazole is formed. It has not been known at all heretofore that the use of the aromatic triamine or tetramine can lead to the formation of the polyamide imine soluble in organic solvents, and that the additional stage of cyclo-dehydration of the polyamide imine can give rise to conversion of it into polybenzimidazole. By so doing, the degree of polymerization and that of cyclization can be regulated optionally and easily.

The invention will be further described below in greater detail in the following order.

(1) Aromatic triamine or tetramine (starting material)
(2) Aromatic diamine (optional starting material)
(3) Aromatic dicarboxylic acid dihalide (starting material)
(4) Process for preparation of the aromatic polyamide imine of the invention
(5) Structure and properties of the aromatic polyamide imine of the invention
(6) Process for preparation of polybenzimidazole of the invention from the aromatic polyamide imine, together with the properties of the polybenzimidazole.

[AROMATIC TRIAMINE OR TETRAMINE]

The aromatic triamine or tetramine (A) of the invention expressed by the following general Formula 6

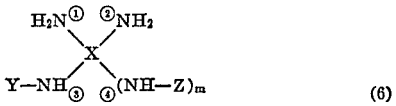

(6)

wherein X, Y, Z, $m$ and others are as defined hereinbefore, is, in a general definition, an aromatic triamine or aromatic tetramine wherein one or two secondary amino groups substituted with the aromatic group Y or Y and Z are each bonded to a nuclear carbon atom adjacent (ortho) to each nuclear carbon atoms of primary amino groups (—NH₂) and the said two primary amino groups are bonded to nuclear carbon atoms of the aromatic group X at positions other than ortho or peri positions.' The expression "one or two secondary amino groups are bonded at ortho positions to one primary amino group (—NH₂) respectively" means that the secondary amino group (3) is bonded at ortho position to the primary amino group (1) and the secondary amino group (4) is bonded at ortho position to the primary amino group (2), excepting the cases where both the secondary groups (3) and (4) are bonded at ortho position of (1) or (2). Preferable as such aromatic triamine or tetramine are compounds expressed by the following Formula 8

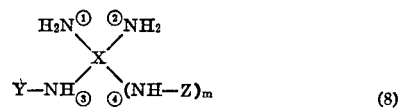

(8)

wherein X is a trivalent or tetravalent aromatic hydrocarbon residue and is selected from the group consisting of a benzene nucleus, biphenyl nucleus, naphthalene nucleus and an atomic group expressed by the following formula

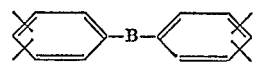

where B represents an alkyl group having 1–3 carbon atoms,

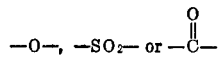

Y and Z are the same or different and represent a monovalent aromatic group which may have a halogeen atom or a non-reactive substituent such as an alkyl group, the —NH—Y group (3) is bonded to a nuclear carbon atom of the aromatic nucleus (X) adjacent to the carbon atom of the primary amino group (—NH$_3$) (1) and the —(NH—Z)$_m$ group is bonded to a nuclear carbon atom of the aromatic nucleus (X) adjacent to the carbon atom of the primary amino group (—NH$_2$) (2); both of groups (3) and (4) should not be bonded to the carbon atoms adjacent to the nuclear carbon atom to which the group (1) or group (2) are attached; the secondary amino groups (3) and (4) should not be bonded at positions adjacent to the nuclear carbon atom of X; and the two primary amino groups (1) and (2) are bonded to nuclear carbon atoms at positions other than those adjacent to the nuclear carbon atoms of the aromatic group (X); and $m$ is 0 or 1, and when $m$ is 0, the said group —(NH—Z)$_m$ represents a hydrogen atom, and inclusive of a case of $m$ being 0, 1–3 hydrogen atoms of the aromatic group (X) may be substituted with a halogen atom or a methyl group.

Among the aromatic triamines or tetramines (A) having the Formula 8 used in the invention, compounds expressed by the following Formula 9 are particularly suitable.

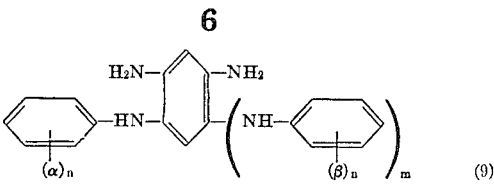

(9)

wherein $m$ is 0 or 1, and when m is 0,

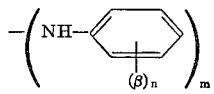

represents a hydrogen atom which may be substituted with a halogen atom or a non-reactive atomic group such as an alkyl group; $n$ is 0–2; and $\alpha$ and $\beta$ are the same or different and represent a halogen atom and/or a non-reactive atomic group such as an alkyl group.

Examples of the aromatic triamines or tetramines of the invention expressed by the above Formulae 6, 8 and 9 are as follows. It should be understood that these examples are for the purpose of facilitating the understanding of the invention, and the invention is in no way limited by them.

(1) When, in Formula 9:

$m$: 0
$\alpha$ and $\beta$: a halogen atom and/or alkyl group
$n$: 0–2

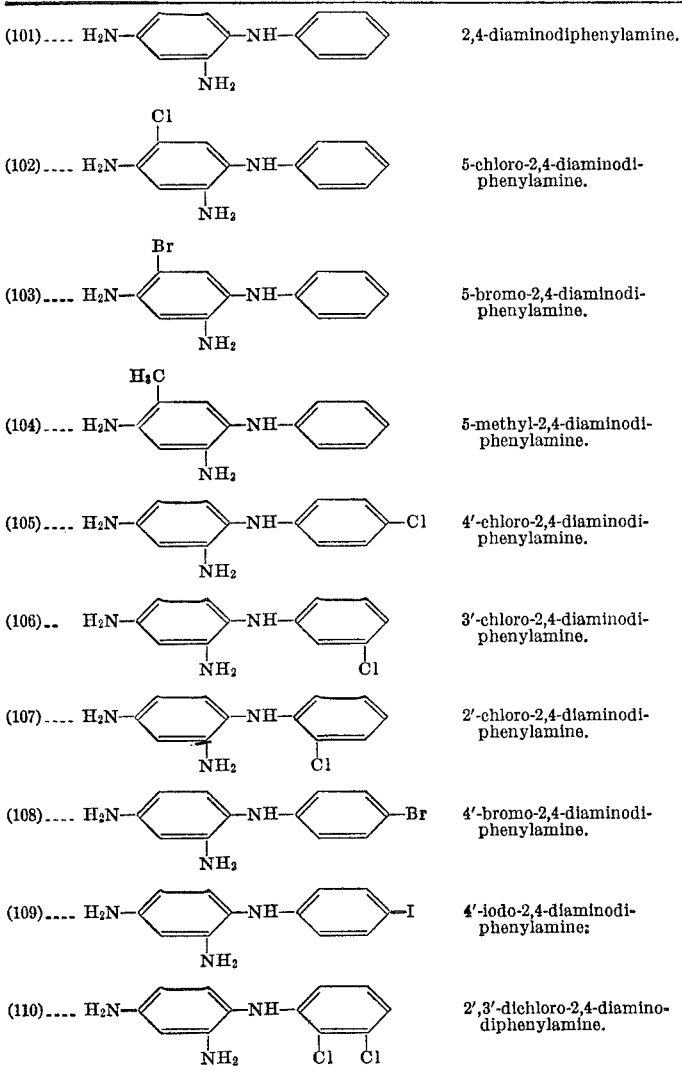

| | | |
|---|---|---|
| (111) | 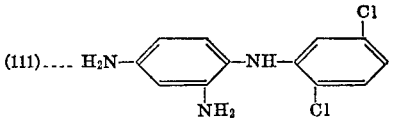 | 2′-5′-dichloro-2,4-diamino-diphenylamine. |
| (112) | 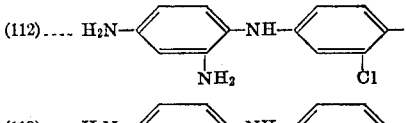 | 3′-4′-dichloro-2,4-diamino-diphenylamine. |
| (113) | 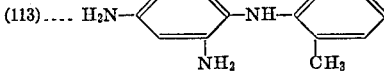 | 2′-methyl-2,4-diamino-diphenylamine. |
| (114) | 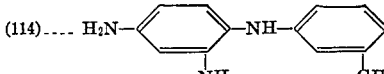 | 3′-methyl-2,4-diamino-diphenylamine. |
| (115) | 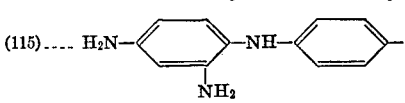 | 4′-methyl-2,4-diamino-diphenylamine. |
| (116) | 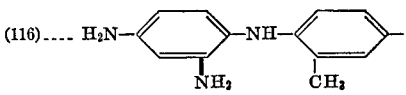 | 2′,4′-dimethyl-2,4-diamino-phenylamine. |
| (117) | 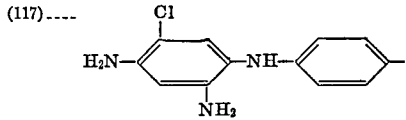 | 5,4′-dichloro-2,4-diaminodiphenylamine. |

(2) When, in Formula 9:
  m: 1
  α and β: halogen atom and/or alkyl group
  n: 0–2

| | | |
|---|---|---|
| (118) | 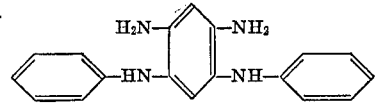 | 1,3-dianilino-4,6-diaminobenzene |
| (119) | 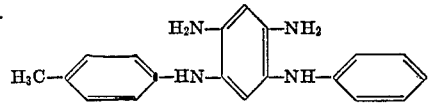 | 1,3-di-p-toluidino-4,6-diaminobenzene. |
| (120) | 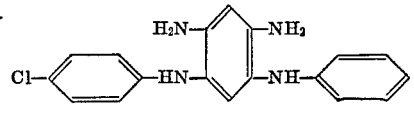 | 1-anilino-3-p-chloroanilino-4,6-diaminobenzene. |
| (121) | 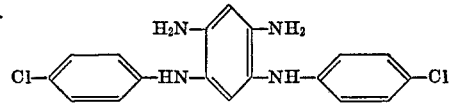 | 1,3-bis[p-chloroanilino]-4,6-diaminobenzene. |

(3) When, in Formula 8
  m: 0
  X: a benzene nucleus

| | | |
|---|---|---|
| (122) | 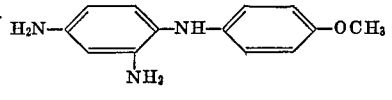 | 4′-methoxy-2,4-diaminodiphenylamine. |
| (123) | 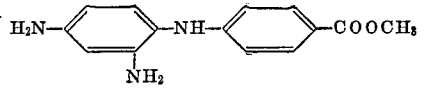 | 4′-methoxycarbonyl-2,4-diaminodiphenylamine. |

(3) When, in Formula 8.—Continued
m: 0
X: a benzene nucleus (124) 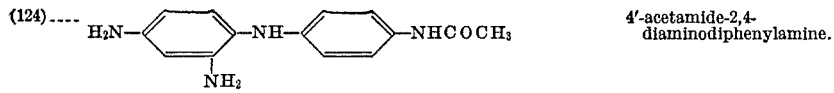 4'-acetamide-2,4-diaminodiphenylamine.

(125) 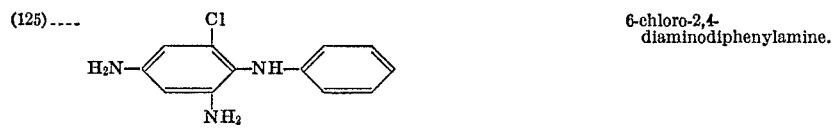 6-chloro-2,4-diaminodiphenylamine.

(126) 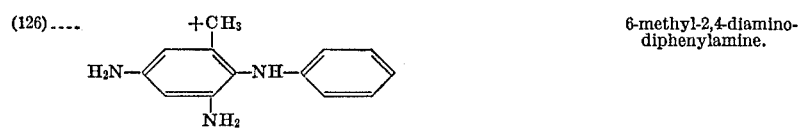 6-methyl-2,4-diaminodiphenylamine.

(127) 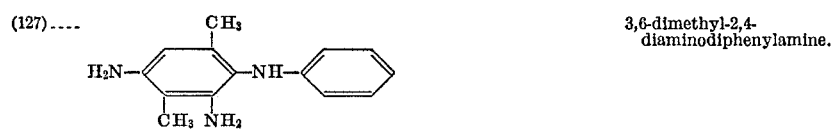 3,6-dimethyl-2,4-diaminodiphenylamine.

(128) 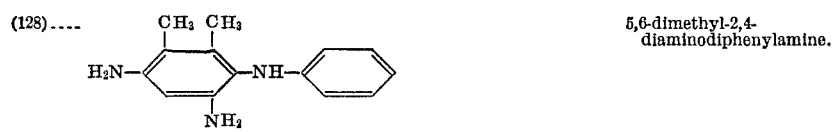 5,6-dimethyl-2,4-diaminodiphenylamine.

(129) 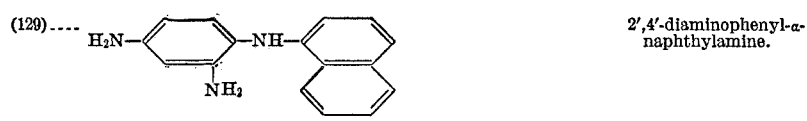 2',4'-diaminophenyl-α-naphthylamine.

(130) 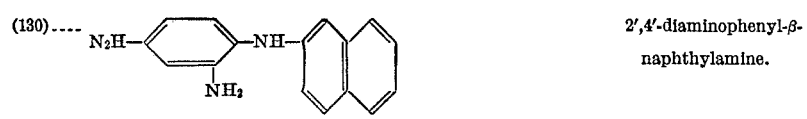 2',4'-diaminophenyl-β-naphthylamine.

(131) 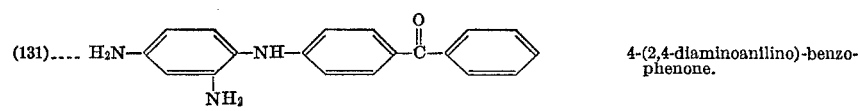 4-(2,4-diaminoanilino)-benzophenone.

(132) 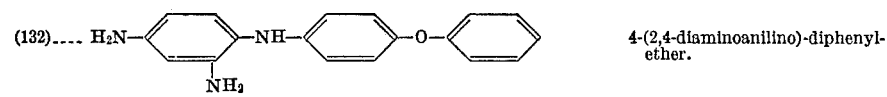 4-(2,4-diaminoanilino)-diphenyl-ether.

(133) 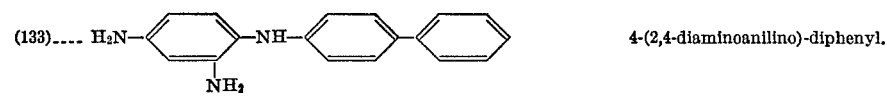 4-(2,4-diaminoanilino)-diphenyl.

(134) 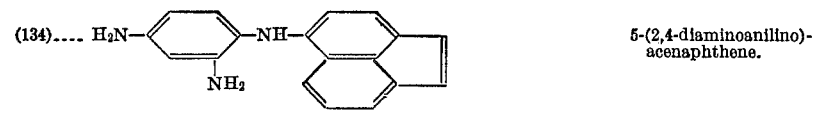 5-(2,4-diaminoanilino)-acenaphthene.

(135)  2-(2,4-diaminoanilino)-fluorene.

(4) When, in Formula 8:
 m: 0
 X: naphthalene nucleus
| | | |
|---|---|---|
| (136).... | 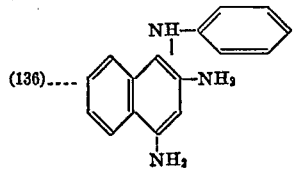 | 1-anilino-2,4-diaminonaphthalene. |
| (137).... | 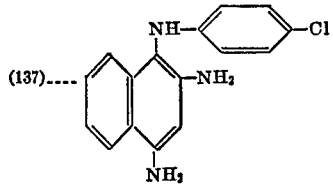 | 1-p-chloroanilino-2,4-diaminonaphthalene. |
| (138).... | 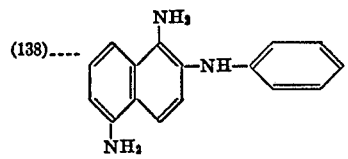 | 2-anilino-1,5-diaminonaphthalene. |
| (139).... | 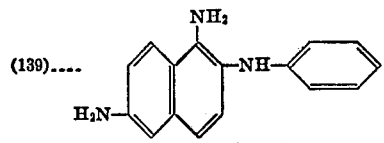 | 2-anilino-1,6-diaminonaphthalene. |
(5) When, in Formula 8:
 m: 0
 X: diphenyl nucleus
| | | |
|---|---|---|
| (140).... | 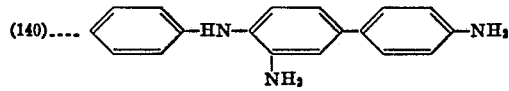 | 4-anilino-3,4'-diaminodiphenyl. |
| (141).... | 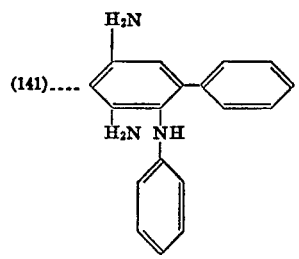 | 2-anilino-3,5-diaminodiphenyl. |
| (142).... | 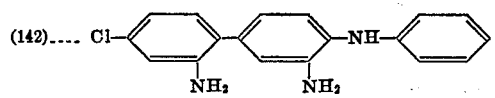 | 4-anilino-4'-chloro-3,2'-diaminodiphenyl. |

(6) When, in Formula 8:
m: 0
X: 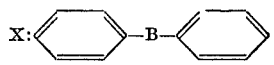

| | | |
|---|---|---|
| (143) | [structure] | 3-anilino-4,6-diaminodiphenyl-ether. |
| (144) | [structure] | 4-anilino-3,3'-diaminodiphenyl-sulfone. |
| (145) | [structure] | 4-anilino-4'-chloro-3,3'-diamino-diphenylsulfone. |
| (146) | [structure] | 4-anilino-3,3'-diaminobenzo-phenone. |
| (147) | [structure] | 4-anilino-4'-chloro-3,3'-diamino-benzophenone. |

(7) When, in Formula 8:
m: 1
X: diphenyl nucleus

| | | |
|---|---|---|
| (148) | [structure] | 4,4'-dianilino-3,3'-diamino-diphenyl. |
| (149) | [structure] | 4,4'-dianilino-5,5'-dimethyl-3,3'-diaminodiphenyl. |

(8) When, in Formula 8,
m: 1
X: naphthalene nucleus or 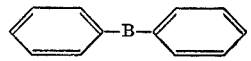

| | | |
|---|---|---|
| (150) | [structure] | 2,6-dianilino-1,5-diaminonaphthalene. |
| (151) | [structure] | 4,4'-dianilino-3,3'-diaminodiphenylmethane. |
| (152) | [structure] | 2,2'-bis(4-anilino-3-aminophenyl)-propane. |
| (153) | [structure] | 4,4'-dianilino-3,3'-diaminodiphenylether. |
| (154) | [structure] | 4,4'-dianilino-3,3'-diaminodiphenylsulfone. |
| (155) | [structure] | 4,4'-dianilino-3,3'-diaminobenzophenone. |

(9) Aromatic triamines belonging to Formula 6

| | | |
|---|---|---|
| (156) | [structure] | 3-amino-4-anilinobenz-4'-aminoanilide. |
| (157) | [structure] | 3-amino-4-anilinobenz-3'-aminoanilide. |
| (158) | [structure] | 3-aminobenz-3'-amino-4'-anilinoanilide. |
| (159) | [structure] | 4-aminobenz-3'-amino-4'-anilinoanilide. |
| (160) | [structure] | N-4-aminophenyl-N'-3'-amino-4'-anilinophenylurea. |
| (161) | [structure] | N-3-aminophenyl-N'-3'-amino-4'-anilinophenyl. |
| (162) | [structure] | N-3'-amino-4'-anilinophenyl-3-aminobenzene sulfoneamide. |

10) Aromatic tetramines belonging to Formula 6

| | | |
|---|---|---|
| (163) | [structure] | 3-amino-4-anilinobenz-3'-amino-4'-anilinoanilide. |
| (164) | [structure] | N,N'-bis(3-amino-4-anilinobenzoyl)-p-phenylene diamine. |
| (165) | Same as above | N,N'-bis(3-amino-4-anilinobenzoyl)-m-phenyldiamine. |
| (166) | [structure] | O,O'-bis(3-amino-4-anilinobenzoyl)-m-hydroquinone. |
| (167) | [structure] | N,N'-bis(3-amino-4-anilinophenyl)-pyromellitimide. |

[AROMATIC DIAMINES]

In the present invention, the aromatic polyamide imine obtained by reaction of the aromatic triamine or aromatic tetramine of the Formula 6, 7 or 9 with the aromatic dicarboxylic acid dihalide of the Formula 7 may be modified by replacing 25 mol percent or less of the aromatic triamine or tetramine (A) with the aromatic diamine (B) mentioned below.

Such an aromatic diamine is, for instance, expressed by the following Formula 10.

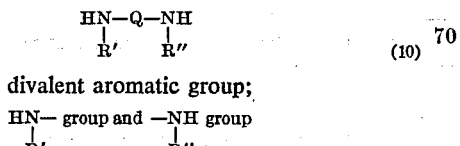

wherein Q is a divalent aromatic group;

$$\text{HN—group and —NH group} \atop R' \qquad R''$$

are bonded to nuclear carbon atoms at positions other than those adjacent or peri to the aromatic group Q; and R' and R" are the same or different and represent an alkyl group having 1–3 carbon atoms or a hydrogen atom.

Among such aromatic diamines, especially preferable are compounds expressed by the following Formula 11.

wherein Q' is at least one aromatic group selected from the group consisting of a phenylene group, biphenylene group, naphthylene group and

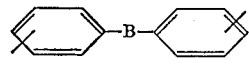

wherein B' is an alkylene group having 1–3 carbon atoms, —O—, —S—, —SO$_2$— or $\underset{\|}{\overset{O}{-C-}}$ $R_1$ and $R_2$ are the same or different and represent a hydrogen atom or a methyl group; and $\underset{R^1}{HN-}$ group and $\underset{R^2}{-NH}$ group are bonded to nuclear carbon atoms of the aromatic group Q' at positions other than adjacent or peri positions.

Examples of the aromatic diamines usable as modifiers are the following compounds.

(1) Aromatic diamines expressed by the Formula 11

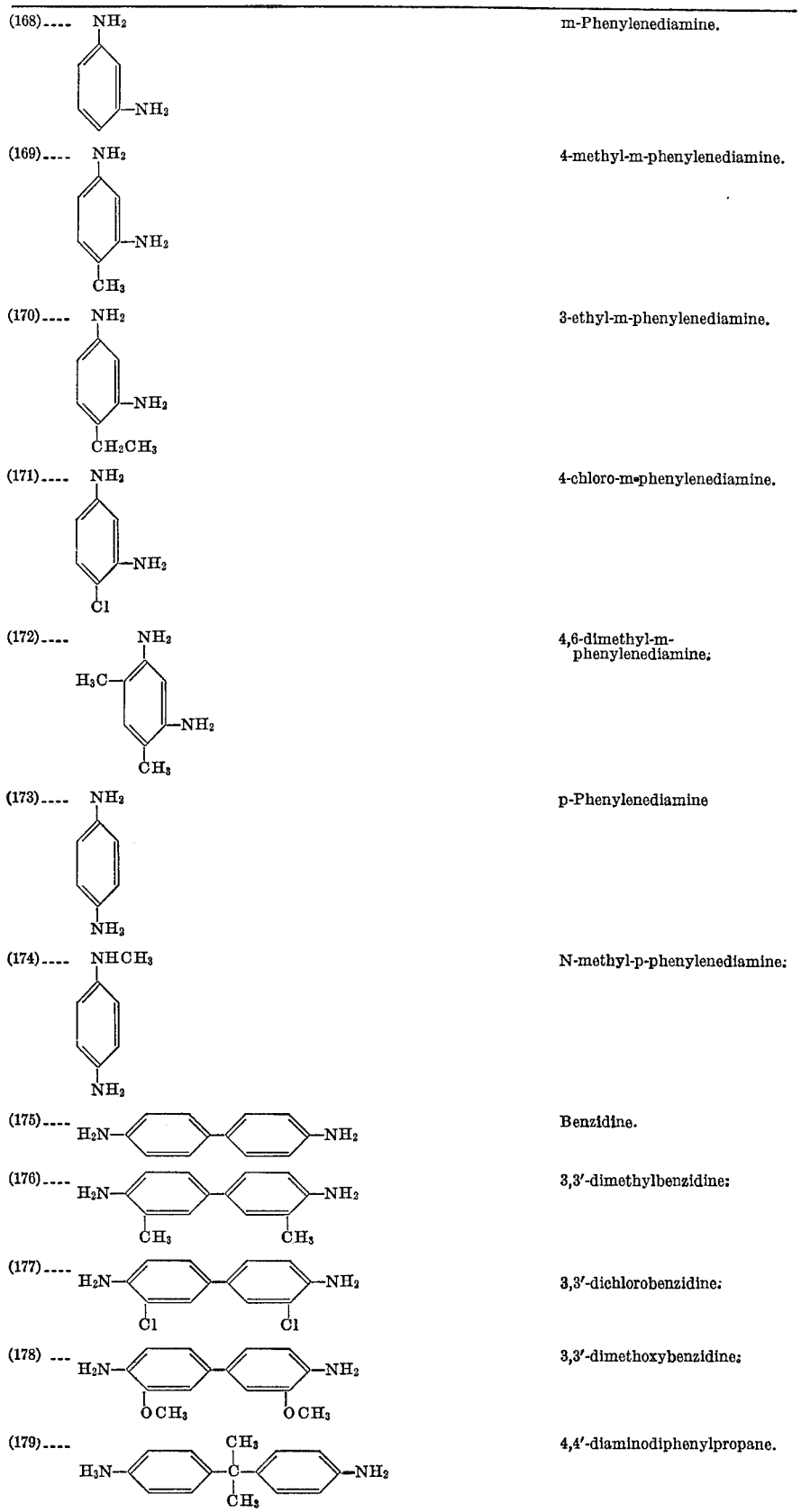

| | | |
|---|---|---|
| (168) | | m-Phenylenediamine. |
| (169) | | 4-methyl-m-phenylenediamine. |
| (170) | | 3-ethyl-m-phenylenediamine. |
| (171) | | 4-chloro-m-phenylenediamine. |
| (172) | | 4,6-dimethyl-m-phenylenediamine. |
| (173) | | p-Phenylenediamine |
| (174) | | N-methyl-p-phenylenediamine. |
| (175) | | Benzidine. |
| (176) | | 3,3'-dimethylbenzidine. |
| (177) | | 3,3'-dichlorobenzidine. |
| (178) | | 3,3'-dimethoxybenzidine. |
| (179) | | 4,4'-diaminodiphenylpropane. |

(1) Aromatic diamines expressed by the Formula 11.—Continued

| | | |
|---|---|---|
| (180) | 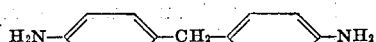 | 4,4'-diaminodiphenylmethane. |
| (181) | 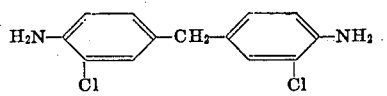 | 3,3'-dichloro-4,4'-diaminodiphenylmethane. |
| (182) | 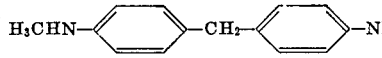 | Bis(4-N-methylaminophenyl) methane. |
| (183) | 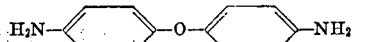 | 4,4'-diaminodiphenylether. |
| (184) | 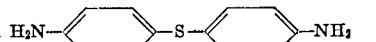 | 4,4'-diaminodiphenylsulfide. |
| (185) | 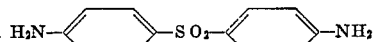 | 4,4'-diaminodiphenylsulfone. |
| (186) | 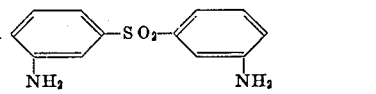 | 3,3'-diamindiphenyl sulfone. |
| (187) | 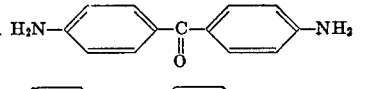 | 4,4'-diaminobenzophenone. |
| (188) | 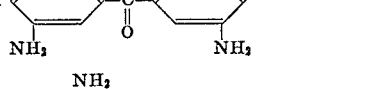 | 3,3'-diaminobenzophenone. |
| (189) |  | 1,5-diaminonaphthalene. |

(2) Aromatic diamine belonging to Formula 10

| | | |
|---|---|---|
| (190) | 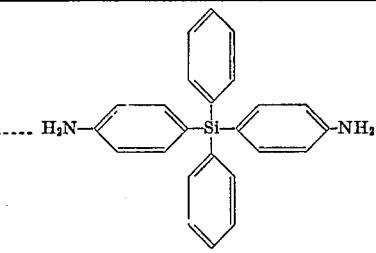 | Bis (4-aminophenyl)diphenylsilane. |
| (191) | 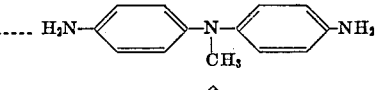 | Bis(4-aminophenyl)-N-methylamine. |
| (192) | 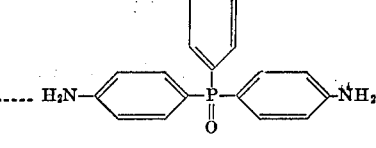 | Bis (4-aminophenyl) phenylphosphineoxide. |
| (193) | 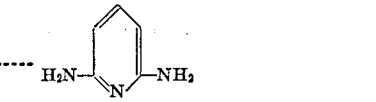 | 2,6-diaminopyridine. |

The said aromatic diamines and aromatic triamines or tetraamines, when reacted with the dihalides of the aromatic dicarboxylic acid mentioned below, may be used either in the form of free bases or in the form of inorganic or organic acid salts which do not hinder the reaction of forming the polyamide imines of the invention. When the said diamines and aromatic triamines or tetramines are used in the form of salts, their hydrochlorides, sulfates and toluenesulfonates are, for instance, preferable, and their carboxylates should not be used. As, however, greater quantities of the acid acceptors need be used during the reaction in the case of using their acid salts, than in the case of using their free bases, it is generally more expedient to use them in the form of free bases except when these diamines, triamines and tetramines can be isolated only in the form of acid salts,

[AROMATIC DICARBOXYLIC ACID DIHALIDES]

As the aromatic dicarboxylic acid dihalides (C) of the invention to be reacted with the aromatic triamines or tetramines (A) or mixtures of at least 75 mol percent of said aromatic triamines or tetramines with less than 25 mol percent of the aromatic diamines (B), compounds of the following formula can be mentioned:

$$Hal \cdot OC-A-CO \cdot Hal \qquad (7)$$

wherein Hal represents a halogen atom; A is a divalent aromatic group; and two —COHal groups should not be at the adjacent or peri positions of the aromatic group A.

In the above Formula 7, a p-phenylene group, m-phenylene group and symmetrical naphthylene group are particularly preferable as A, and a chlorine atom is particularly preferable as Hal.

Specific examples of such aromatic dicarboxylic acid dihalide are as follows:

| | | |
|---|---|---|
| (194) | ClOC—⟨ ⟩—COCl | Terephthaloyl dichloride. |
| (195) | ⟨ ⟩—COCl with COCl | Isophthaloyl dichloride. |
| (196) | Cl-⟨ ⟩—COCl with COCl | 5-chloro-isophthaloylchloride. |
| (197) | ClOC—⟨ ⟩—COCl with Cl | 2-chloro-terephthaloylchloride. |
| (198) | ClOC—⟨Cl⟩—COCl with Cl | 2,5-dichloro-terephthaloylchloride. |
| (199) | ClOC—⟨Cl,Cl⟩—COCl with Cl, Cl | Tetrachloro-terephthaloyl chloride. |
| (200) | ClOC—⟨ ⟩—COCl | 4,4'-dibenzoyl chloride. |
| (201) | ⟨ ⟩—⟨ ⟩ with COCl, COCl | 3,3'-dibenzoyl chloride. |
| (202) | ClOC—⟨ ⟩—SO₂—⟨ ⟩—COCl | 4,4'-sulfonyldibenzoyl chloride. |
| (203) | ⟨ ⟩—⟨ ⟩ with COCl, COCl | 3,3'-sulfonyldibenzoyl chloride. |
| (204) | ClOC—⟨ ⟩—O—⟨ ⟩—COCl | 4,4'-oxydibenzoyl chloride. |
| (205) | ⟨ ⟩—O—⟨ ⟩ with COCl, COCl | 3,3'-oxydibenzoyl chloride. |
| (206) | ClOC—⟨ ⟩—O—⟨ ⟩ with COCl | 3,4'-oxydibenzoyl chloride. |
| (207) | ClOC—⟨ ⟩—CO—⟨ ⟩—COCl | 4,4'-benzophenonedicarbonyl chloride. |
| (208) | ⟨ ⟩—CO—⟨ ⟩ with COCl, COCl | 3,3'-benzophenone-dicarbonyl chloride. |
| (209) | ClOC—⟨ ⟩—CH₂—⟨ ⟩—COCl | Diphenylmethane-4,4'-dicarbonyl choloride. |

| # | Structure | Name |
|---|---|---|
| (210) | 3,3'-CH₂-linked bis(benzoyl chloride) | Diphenylmethane-3,3'-dicarbonyl chloride. |
| (211) | 4,4'-C(CH₃)₂-linked bis(benzoyl chloride) | 2,2-bis(p-chlorocarbonylphenyl)propane. |
| (212) | 1,1,3-trimethylindane with COCl groups | 1,1,3-trimethyl-5-chlorocarbonyl-3-(p-chlorocarbonylphenyl)indane. |
| (213) | Naphthalene with COCl at 2,6 | Naphthalene-2,6-dicarbonyl chloride. |
| (214) | Naphthalene with COCl at 2,7 | Naphthalene-2,7-dicarbonyl chloride. |
| (215) | Naphthalene with COCl at 1,5 | Naphthalene-1,5-dicarbonylchloride. |
| (216) | Pyridine with COCl at 2,5 | Pyridine-2,5-dicarbonyl chloride. |
| (217) | Pyridine with COCl at 3,5 | Pyridine-3,5-dicarbonyl chloride. |
| (218) | Pyridine with COCl at 2,6 | Pyridine-2,6-dicarbonyl chloride. |
| (219) | Furan with COCl at 2,5 | Furan-2,5-dicarbonyl chloride. |
| (220) | Pyrazine with COCl at 2,5 | Pyrazine-2,5-dicarbonyl chloride. |
| (221) | Quinoline with COCl at 4,8 | Quinoline-4,8-dicarbonyl chloride. |

[PROCESS FOR PREPARATION OF AROMATIC POLYAMIDE IMINES]

According to the invention, the polyamide imines are prepared by reacting the aromatic triamines or tetramines (A) or mixtures of at least 75 mol percent of the aromatic triamines or tetramines (A) with 25 mol percent or less of the aromatic diamines (B), with the aromatic dicarboxylic acid dihalides (C) in inert organic liquid mediums. In this reaction, it is not necessary that each of the reactants (A), (B) and (C) should be singular. For instance, two aromatic triamines or tetramines (A) may be reacted with the reactant (C) with or without the use of the reactant (B), or at least two of the reactant (B) and/or reactant (C) may be reacted with the reactant (A).

As the inert organic liquid medium, any inert organic solvent may be used so long as it dissolves at least one, preferably both, of the aromatic triamine or tetramine (A) and aromatic dicarboxylic acid dihalide (C), and dissolves, or at least swells, a polymer to a degree such that the partially formed polymer is maintained in an active condition until the reaction completely proceeds and gives a desired high molecular weight polymer. The "inert" means that the solvent is substantially non-reactive in the reaction of forming the polyamide imine of the invention.

It is preferable to take into consideration a reaction method employed in the formation of the intended polyamide imine when determining what compound is specifically employed as the inert organic liquid medium.

Examples of the reaction methods than can be employed in the invention are:

(1) A method in which reaction is carried out in the presence of an organic acid acceptor under substantially anhydrous conditions; and (2) A method in which reaction is carried out in the presence of an aqueous solution of an acid acceptor.

In the polymerization reaction under substantially anhydrous conditions (1), both the inert organic liquid medium and the organic acid acceptor are used, the inert organic liquid medium itself having no ability as the acid acceptor (a); or the inert organic liquid medium itself has an ability as the acid acceptor and therefore concurrently acts as the acid acceptor (b). In the case of (a), the inert organic liquid medium should be one which dissolves the organic acid acceptor. As the inert organic liquid of this type, the following compounds can be cited as examples: halogen-substituted non-aromatic hydrocarbons in which at least one hydrogen atom is attached to the carbon atom bonded to a halogen atom, such as chloroform, methylene chloride, 1,1,2-trichloroethane, 1,2-dichloroethane, chlorobromomethane, s-tetrachloroethane and cis-1,2-dichloroethane, cyclic methylene sulfones such as tetramethylene sulfone and 2,4-dimethyltetramethylene sulfone, methyl ethyl ketone, tetrahydrofuran, acetonitrile, propionitrile, diethyl cyanamide, dimethyl cyanamide, and mixtures of these, tetrahydrofuran being particularly suitable.

Any compound is usable as the organic acid acceptor usable with the inert organic liquid medium so long as it is capable of reacting with an acid (hydrogen halide) formed during the polymerization reaction, and is a basic substance which tends more to react with the said acid (hydrogen halide) than with the aromatic triamines or tetramines as reactants and does not substantially react with the aromatic dicarboxylic acid dihalide which is one of the reactants of the invention. Such basic substances (acid acceptor) include organic tertiary amines such as trimethyl amine, triethyl amine, N-ethyl piperidine, N-methyl morpholine, N-ethyl morpholine, N,N-dimethylbenzyl amine and N,N-diethylbenzylamine, and polyfunctional tertiary amines N,N,N',N'-tetramethylhexamethylene diamine.

As the inert organic liquid medium which can concurrently act as the acid acceptor (b), we can mention amide-type organic compounds such as N,N-dimethylacetamide, N,N-diethyl acetamide, N,N-dimethylpropionamide, N,N-dimethylbutyramide, 1-methyl-2-pyrrolidone, 1,5-dimethyl-2-pyrrolidone, 1-ethyl-2-pyrrolidone, N,N,-N',N'-tetramethyl urea, N-acetyl pyrrolidine and hexamethyl phosphoramide, and mixtures of these.

Better results may sometimes be obtained by adding to the organic solvent a small amount of alkali or alkaline earth metal such as lithium chloride, lithium bromide and calcium chloride.

When the polymerization reaction is carried out in the presence of an aqueous solution of an acid acceptor, it is necessary to use an inert organic liquid medium which is partially miscible with water. Examples of such inert liquid medium are cyclic non-aromatic oxygenated organic solvents, for instance, cyclic sulfones such as cyclic tetramethylene sulfone and 2,4-dimethyl cyclic tetramethylene sulfone, cyclic ketones such as cyclohexanone and cyclopentanone, and cyclic ethers such as tetrahydrofuran and propylene oxide, lower aliphatic ketones such as methyl ethyl ketone and acetone, and mixtures of these.

Furthermore, in the polycondensation reaction of the type (2), a suitable neutral salt may be added to an aqueous phase besides the acid acceptor in order to properly restrain the miscibility of the inert organic liquid medium with water. The usable acid acceptors and neutral salts are as follows:

ACID ACCEPTOR

Preferable are hydroxides of alkali metals such as lithium hydroxide, sodium hydroxide and potassium hydroxide and carbonates or bicarbonates of alkali metals such as sodium carbonate and sodium bicarbonate. Hydroxides, carbonates or bicarbonates of alkaline earth metals such as magnesium hydroxide, magnesium carbonate and calcium bicarbonate are also usable either alone or, if necessary, together with the carbonate or bicarbonate of alkali metal. It is also possible to use water-soluble organic tertiary amines such as triethylamine.

It is preferable that these acid acceptors should be used in amounts sufficient to react with a total amount of an acid (hydrogen halide) generated by the reaction.

NEUTRAL SALT

As the neutral salts, there are used inorganic salts having a large solubility in water and being non-reactive with the reactants. Preferable are alkali metal halides such as sodium chloride, potassium chloride and lithium chloride. Sulfates and nitrates of the metal are also usable, but it is preferable to use the same salt as that generated as a result of the reaction. The use of such neutral salt is especially effective when such a reaction medium as acetone which has a very large hydrophilicity is used, and it is possible to obtain a polymer having a higher molecular weight than in the absence of the neutral salt.

Now, the reaction conditions will be described.

According to the polycondensation method (1), a solution is prepared by adding the aromatic triamine or tetramine (A) and, if necessary, the acid acceptor and/or other additive. The aromatic triamine or tetramine (A) may be used in the form of its acid salt if necessary. In this case the acid salt should be converted to a free form in the solution by adding a calculated amount of an acid acceptor. The solution is cooled, preferably to 0° to —20° C., and a dicarboxylic acid halide itself or in the form of a solution in a reaction medium is added to the cooled solution. The reaction mixture is agitated until the polycondensation is completed. The reaction temperature is preferably in the range of 0 to 50° C. The time required to complete the reaction varies depending on the type of the starting materials, the type of the reaction solvent and the reaction temperature, but usually 0.5 to 8 hours. A polymer is separated by pouring a reaction mixture into a non-solvent. If the polymer exists as a homogeneous solution at the end of the reaction, it can be utilized directly as a polymer solution for shaping purposes.

The polycondensation method (2) is typically practised by adding a solution of an aromatic dicarboxylic acid halide (C) in an insert organic solvent to a solution consisting of an aromatic triamine or tetramine (A), an organic solvent, acid acceptor and water and, if necessary emulsifier, and agitating the mixture rapidly. The aromatic triamine or tetramine (A) may be used in the form of its acid salt, if necessary. In this case the acid salt should be converted to a free form in the solution by adding a calculated amount of the acid acceptor. The reaction is carried out preferably at a temperature not higher than 50° C., and is usually completed within about 15 minutes. A polymer is obtained usually in powder form, and can be easily removed by filtration.

The polycondensation method (2) can be practised by two ways. One way is the typical method mentioned before. The other way consists in mixing a solution in the inert organic solvent of the aromatic triamine (A) with a solution in the inert organic solvent of the aromatic dicarboxylic acid dihalide (C) to thereby form a solution or dispersion of an oligomer having reactivity, and then contacting it with an aqueous solution of the acid acceptor to complete the polycondensation.

There is hardly any difference in the properties and degree of polymerization between the polymers (aromatic polyamide imines) obtained by these two methods. This suggests that according to the process of the invention, the aromatic triamine or tetramine (A) and aromatic dicarboxylic acid halide (C) are reacted in the inert organic liquid medium even if an aqueous solution of the acid acceptor is used.

As the aromatic triamine or tetramine (A) of the invention is difficultly soluble in water, it hardly moves into an aqueous phase even if its solution in an inert organic solvent is mixed with an aqueous solution of the acid acceptor. These facts indicate that the reaction of the invention of forming an aromatic polyamide imine from an aromatic triamine or tetramine (A) and an aromatic dicarboxylic acid dihalide (C) quite differs in aspect from the known interfacial polycondensation of an aromatic diamine and an organic dicarboxylic acid dihalide. According to the known interfacial polycondensation method, the aromatic diamine is polymerized in an interface transient from an aqueous phase containing the acid acceptor dissolved therein to an organic solvent phase. Therefore, the molecular weight of an obtained polymer was largely affected by such factors as the rate of agitation of the reaction system, concentration of a reaction solution and the basicity of an acid acceptor. In the present invention, however, the molecular weight of the aromatic polyamide imine is hardly affected by these factors even if the polymerization is carried out in the same way as the said known interfacial polycondensation method. This is one of the very unique characteristics of the process of the invention.

In the polycondensation of the types (1) and (2), an aromatic polyamide imine modified with an aromatic diamine can be obtained by mixing a predetermined amount of an aromatic diamine (B) with an aromatic triamine or tetramine (A), and carrying out the polycondensation under the same conditions as above.

Furthermore, in the polycondensation reaction of the invention, some agents for regulating the molecular weights of the polyamide imines may be added to a reaction system in small amounts. The regulators preferably include, monofunctional aromatic amines and carbonyl chlorides such as aniline toluidine, p-chloroaniline, m-chloroaniline, benzoic acid chloride, p-toluoyl chloride and p- or m-chlorobenzoyl chloride. Any monofunctional aromatic compound may be used so long as it has a primary amino group or carbonyl halide group with a reactivity equivalent to that of a primary amino group of the aromatic triamine or tetramine (A) or carbonyl halide of the aromatic dicarboxylic acid dihalide, and does not substantially hinder the intended condensation reaction.

Inventors' research has indicated that if 2,4-diaminodiphenylamine expressed by the following formula

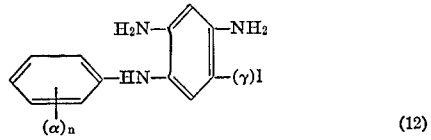

(12)

where $n$ and $l$ represent an integer of 0–2, and $\alpha$ and $\gamma$ represent a halogen atom or methyl group, or a mixture of 2,4-diaminodiphenyl amine with not more than 25 mol percent, based on the 2,4-diaminodiphenyl amine, of an aromatic diamine (B) are reacted very smoothly, according to the polycondensation method (2), with the aromatic dicarboxylic acid dichloride (C) in methyl ethyl ketone or an inert organic liquid medium, which contains at least 50% by weight, preferably more than 70% by weight, of methyl ethyl ketone and retains the sufficient solubility of 2,4-diaminodiphenyl amine, in the presence of an aqueous solution of a suitable acid acceptor, and that it is possible to obtain a high polymer having an inherent viscosity (measured at 25° C. using dimethyl formamide as a solvent) of, for instance, 0.6 or more. It has also been found that in this procedure, the concentration of 2,4-diaminodiphenyl amine can be made high, and even if the polycondensation is carried out by using a solution of a saturated concentration, no trouble occurs, and that as the resulting polymer is very finely powdery, the polymer can be easily separated from the reaction mixture, and the inorganic salt can be easily and completely removed from the polymer by cleansing.

[AROMATIC POLYAMIDE IMINES]

According to the invention, the above-mentioned polycondensation leads to the formation of an aromatic polyamide imine wherein at least 75 mol percent of the entire structural unit is composed of at least one aromatic amide imine unit expressed by the following general formula

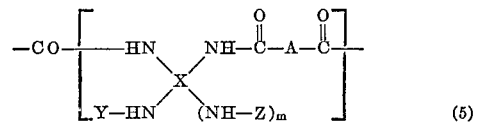

(5)

wherein X is a trivalent or tetravalent aromatic group; Y and Z are the same or different and represent a monovalent aromatic group; each of —NH—Y and

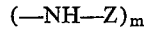

is bonded to a nuclear carbon atom adjacent to each of nuclear carbon atoms to which two carboimino groups

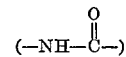

are attached, with the proviso that said —NH—Y and —(NH—Z)$_m$ groups as well as said two carboimino groups are bonded to nuclear carbon atoms at positions other than the adjacent positions of said aromatic group, and that two carboimino groups and two groups, —NH—Y and —(NH—Z)$_m$ should not be adjacent to one another in the order of

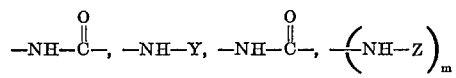

and $m$ is 0 or 1, and when $m$ is 0, —(NH—Z)$_m$ represents a hydrogen atom which may be substituted with a halogen atom or a non-reactive atomic group such as an alkyl group.

If a compound of the Formula 8 is used as the aromatic triamine or tetramine of the invention, an aromatic polyamide imine consisting of the structural unit expressed by the following formula

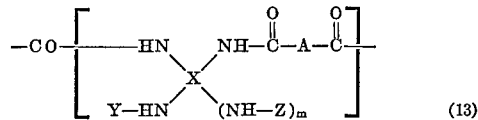

(13)

wherein X is a trivalent or tetravalent aromatic hydrocarbon residue selected from the group consisting of a benzene nucleus, biphenyl nucleus, and an atomic group of the formula

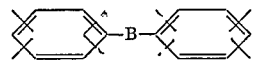

where B represents an alkylene group having 1–3 carbon atoms,

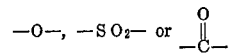

Y and Z may be the same or different and represent a monovalent aromatic group, which may have non-reactive substituents such as halogen atoms or alkyl group; A is at least one divalent aromatic group; the two

groups are bonded to the nuclear carbon atoms of the aromatic group A at positions other than adjacent or peri positions; each of —NH—Y and ⟨—NH—Z⟩$_m$ is bonded to a nuclear carbon atom adjacent to each of nuclear carbon atoms to which two carboimino groups

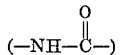

are attached, with the proviso that said —NH—Y and ⟨NH—Z⟩$_m$ groups as well as said two carboimino groups are bonded to nuclear carbon atoms at positions other than the adjacent positions of said aromatic group, and that two carboimino groups and two groups, —NH—Y and ⟨NH—Z⟩$_m$ should not be adjacent to one another in the order of

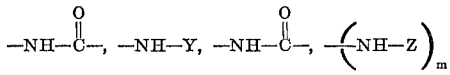

and $m$ is 0 or 1, and when $m$ is 0, the said group ⟨NH—Z⟩$_m$ represents a hydrogen atom, and inclusive of a case of $m$ being 0, 1–3 hydrogen atoms of the aromatic group (X) may be substituted with a halogen atom or a methyl group.

When a mixture consisting of at least 75 mol percent of the aromatic triamine or tetramine of the Formula 8 and 25 mol percent or less of the aromatic diamine of the Formula 10 is reacted with the aromatic dicarboxylic acid dihalide of the Formula 7, there is obtained an aromatic polyamide imine consisting of at least 75 mol percent of a structural unit expressed by the formula

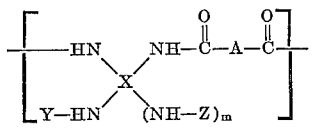 (14)

wherein X is a trivalent or tetravalent aromatic hydrocarbon residue selected from the group consisting of a benzene nucleus, naphthalene nucleus and an atomic group of the formula

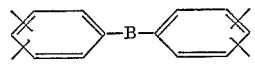

in which B is an alkylene group of 1–3 carbon atoms,

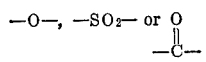

Y and Z may be the same or different and represent a monovalent group which may have non-reactive substituents such as halogen atoms or alkyl groups; A is at least one divalent aromatic group; the two

groups are bonded to nuclear carbon atoms at positions other than adjacent or peri positions of the aromatic group A; each of —NH—Y and ⟨—NH—Z⟩$_m$ is bonded to a nuclear carbon atom adjacent to each of nuclear carbon atoms to which two carboimino groups

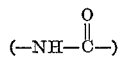

are attached, with the proviso that said —NH—Y and ⟨NH—Z⟩$_m$ groups as well as said two carboimino groups are bonded to nuclear carbon atoms at positions other than the adjacent positions of said aromatic group, and that two carboimino groups and two groups, —NH—Y and ⟨NH—Z⟩$_m$ should not be adjacent to one another in the order of

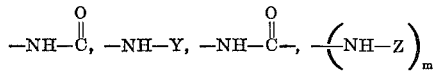

and $m$ is 0 or 1, and when $m$ is 0, the said group —(NH—Z)$_m$ represents a hydrogen atom, and inclusive of a case of $m$ being 0, 1–3 hydrogen atoms of the aromatic group X may be substituted with a halogen atom or a methyl group and 25 mol percent or less of a structural unit expressed by the following formula

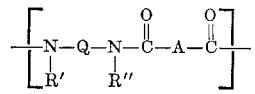 (15)

wherein Q is a divalent aromatic group;

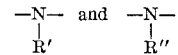

are bonded to nuclear carbon atoms at positions other than adjacent or peri positions of the aromatic group Q; R' and R'' may be the same or different and represent an alkyl group having 1–3 carbon atoms or a hydrogen atom; A is a divalent aromatic group; and the two

groups are bonded to nuclear carbon atoms at positions other than adjacent or peri positions of the aromatic group A.

When the aromatic triamine or tetramine of the Formula 9 is reacted with terephthaloyl chloride and/or isophthaloyl chloride in the presence or absence of the aromatic diamine of the Formula 11, there is obtained an aromatic polyamide imine consisting of 75–100 mol percent of a structural unit expressed by the following formula

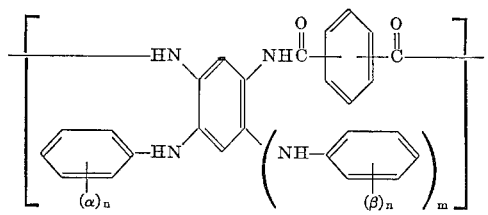 (16)

wherein $m$ is 0 or 1, and when $m$ is 0,

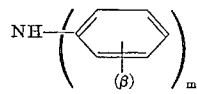

represents a hydrogen atom which may be substituted with a halogen atom or a non-reactive atomic group such as a methyl group; the two

groups are bonded at para or meta to the benzene nucleus; $n$ is 0–2; and $\alpha$ and $\beta$ may be the same or different, and represent a halogen atom or a methyl group, and 0–25 mol percent of a structural unit expressed by the following formula

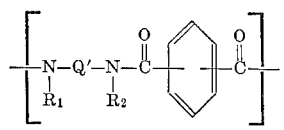 (17)

wherein Q' is selected from the group consisting of a phenylene group, biphenylene group, naphthylene group and an atomic group of the formula

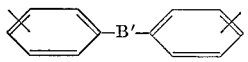

in which B' is an alkylene group having 1–3 carbon atoms,

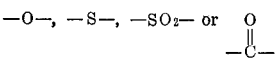

R$_1$ and R$_2$ are a hydrogen atom or a methyl group which may be the same or different; and —NR$_1$— and —NR$_2$— are bonded to nuclear carbon atoms at positions other than adjacent or peri positions of the aromatic nucleus Q'.

Among the advantages of the so obtained aromatic polyamide imines of the invention are:

(1) As the N-aryl substituted secondary amino group which is in itself reactive is at a position adjacent to the primary amino group, even the use of aromatic triamine or tetramine leads to the formation of the aromatic polyamide imine soluble in N,N-dialkyl amides and N-alkyl cyclic amides such as N,N-dimethyl acetamide, N,N-dimethyl formamide and 1-methyl-2-pyrrolidone. The aromatic polyamide imines of the invention are also soluble in tetramethyl urea, hexamethyl phosphoramide and dimethyl sulfoxide, and in amides represented by acetamide and cyclic amides represented by epsilon-caprolactam, which are normally solid at room temperature, at a temperature above the melting points of these solvents. Some of polyamide imines are soluble in phenols such as m-cresol and phenol.

Known heat-resistant polymers such as polyheterocyclic compounds and wholly aromatic polyamides exhibit only a limited solubility in organic solvents, and it has been extremely difficult to produce stable solutions having a high concentration of the polymers. On the other hand, the aromatic polyamide imines of the invention can be made into stable solutions of high concentration by using the above-mentioned organic solvents. Moreover, these solutions can be diluted with other diluents, such as acetone, toluene, cyclohexane, benzene and methylene chloride.

(2) Hence, the aromatic polyamide imines of the invention can be used as paints and varnishes by dissolving into the above-mentioned organic solvents, or can be shaped with an easy operation into films, fibers and other articles.

(3) The aromatic polyamide imines of the invention can be easily converted by further thermic and/or chemical treatment into thermally and chemically stable N-aryl substituted polybenzimidazoles. The so obtained polybenzimidazoles are usually soluble in proper organic solvents.

Furthermore, it has been found that when the aromatic polyamide imines of the invention are converted into polybenzimidazoles after treating the polyamide imines with hot water at a temperature of at least 60° C., preferably above 80° C., the obtained polybenzimidazoles give very smooth transparent solutions free from a gelled portion. Hence, shaped articles of very good quality can be obtained from the solutions of polybenzimidazoles in organic solvents, and the solutions are directly used as paints and varnishes.

When the aromatic polyamide imines of the invention are prepared according to the polycondensation method (2) using an aqueous solution of the acid acceptor, the above-mentioned hot water treatment of the obtained polymers makes it possible to substantially completely remove the salts mainly formed by the reaction and retained in the polymers as impurity. The so-obtained aromatic polyamide imines and polybenzimidazoles of the invention are very excellent as electric insulating materials.

[PROCESS FOR PREPARATION OF N-ARYL SUBSTITUTED POLYBENZIMIDAZOLES]

The aromatic polyamide imines of the invention can be converted into N-aryl substituted polybenzimidazoles by subjecting them to a thermic or chemical treatment, thereby inducing a cyclo-dehydration reaction. It is preferable generally that the above cyclo-dehydration reaction should be induced by heating. When the cyclo-dehydration reaction is induced only by heating, the reaction can be carried out at a temperature above 200° C. but below a point at which the decomposition of the resulting polybenzimidazoles takes place to a degree such as to cause substantial inconveniences. Generally, however, it is preferable that the reaction should be carried out at a temperature from 200°–600° C., particularly 250° to 500° C. If, however, an acidic substance is conjointly used in heating, the cyclo-dehydration reaction is promoted, and even if the heating temperature is lower, for instance, 60° C., it is possible to induce the cyclo-dehydration reaction satisfactorily. Therefore, if an acidic substance is conjointly used in the cyclo-dehydration reaction, the heating temperature may be above 60° C. but below a temperature at which the decomposition of the above-mentioned polybenzimidazole takes place to a degree such as to involve disadvantages. Generally, however, a temperature between 60–300° C., particularly 80–200° C. is suitable.

The proceeding of a cyclo-dehydration is, in general, affected by the heating temperature and heating time. If, therefore, the heating temperature is high, the heating time may be short, or vice versa. Any acidic substance is usable in the invention so long as it does not substantially cause side-reactions during the cyclo-dehydration reaction. But especially preferable are those acidic substances which have a function of catching water formed in the cyclo-dehydration reaction, namely dehydration action. Examples are inorganic or organic acids such as hydrochloric acid, phosphoric acid, polyphosphoric acid, p-toluenesulfonic acid, oxalic acid, formic acid, dichloroacetic acid and trifluoroacetic acid. The amount of such acidic substance to be added may be about 0.001–15% by weight based on the polyamide imine, but the upper limit is not necessarily restricted to 15% by weight.

As mentioned before, the aromatic polyamide imines of the invention can be converted into polybenzimidazoles by cyclo-dehydrating them using a chemical treatment alone. According to one example of such chemical treatment, a polyamide imine is contacted with a relatively large amount of an acidic substance having a dehydrating action such as polyphosphoric acid. Thus, the cyclo-dehydration reaction can be induced even at room temperature, but the raising of the temperature will promote the cyclo-dehydration reaction accordingly.

Certain organic acids such as formic acid, dichloroacetic acid, and trifluoroacetic acid do not dissolve the aromatic polyamide imines, but dissolve most of the polybenzimidazoles of the invention. If, therefore, the above-mentioned specific acids are used as the medium for the aromatic polyamide imine in the cyclo-dehydration reaction either alone or conjointly with the inert organic solvent, solutions of the polybenzimidazoles can be obtained. It is necessary that such acids having a solubility in the polybenzimidazole should have only a poor hydrolyzing action.

In the present specification and claims, the polybenzimidazoles mean those resulting from conversion by the cyclo-dehydration of at least 50 mol percent of the aromatic amide imine structural unit expressed by the Formulae 5, 13, 14, and 16 into a benzimidazole ring.

Thus, according to the invention, N-aryl substituted polybenzimidazoles can be prepared by subjecting polyamide imines in which at least 75 mol percent of the entire structural unit is composed of at least one aromatic amide imine structural unit expressed by the following formula

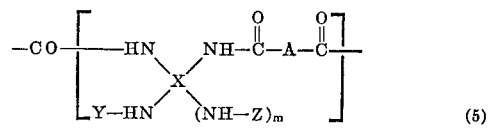

(5)

wherein X is a trivalent or tetravalent aromatic group; Y and Z are the same or different and represent a monovalent aromatic group; and each of —NH—Y and (—NH—Z)$_m$ is bonded to a nuclear carbon atom adjacent to each of nuclear carbon atoms to which two carboimino group

are attached, with the proviso that said —NH—Y and (—NH—Z)$_m$ groups as well as said two carboimino groups are bonded to nuclear carbon atoms at positions other than the adjacent positions of said aromatic group, and that two carboimino groups and two groups, —NH—Y and ⁅NH—Z⁆$_m$ should not be adjacent to one another in the order of

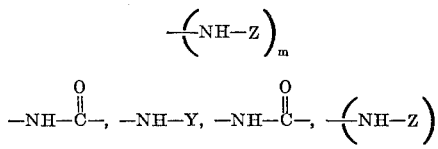

$m$ is 0 or 1, and when $m$ is 0, (NH—Z)$_m$ represents hydrogen atom which may be substituted with a halogen atom or a non-reactive atomic group such as an alkyl group, to a thermic or chemical treatment whereby at least 50 mol percent of the above-mentioned aromatic amide imine structural unit is converted into an N-aryl substituted benzimidazole structure expressed by the following formula

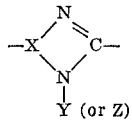

(18 wherein X, Y and Z are as defined above.

If an aromatic polyamide imine obtained by reacting an aromatic triamine of Formula 9 with an aromatic dicarboxylic acid dihalide in the presence or absence of an aromatic diamine is cyclo-dehydrated in accordance with the invention, the following polybenzimidazole will result, which consists of (A) At least 50 mol percent of a structural unit of the following formula

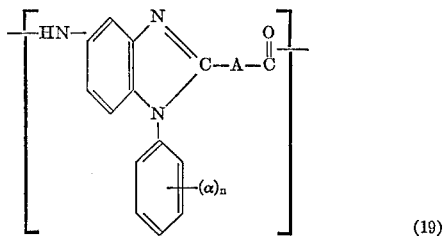

(19)

wherein A is at least one divalent aromatic group;

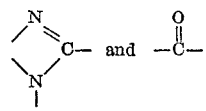

are bonded to nuclear carbon atoms at positions other than adjacent or peri positions of the aromatic group A; $n$ is 0–2; and α may be the same or different and represents a halogen atom and/or a non-reactive atomic group such as an alkyl group, (B) 0–25 mol percent of a structural unit expressed by the following formula

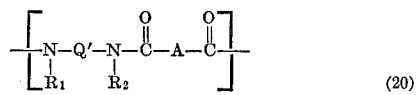

(20)

wherein Q′ represents a phenylene group, biphenylene group, naphthylene group or a group

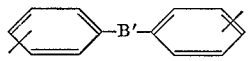

in which B′ is an alkylene group having 1–3 carbon atoms,

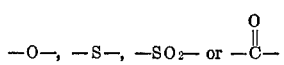

R$_1$ and R$_2$ may be the same or different and represent a hydrogen atom or a methyl group; —NR$_1$— and —NR$_2$— are bonded to nuclear carbon atoms at positions other than adjacent or peri positions of the aromatic nucleus Q′; and A is as defined above, and (C) The remainder being a structural unit expressed by the general formula

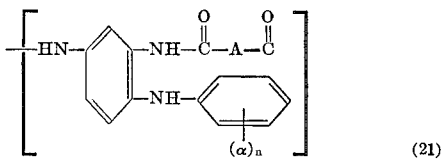

(21)

wherein A, α, and $n$ are as defined above.

As the group A, a p-phenylene group or m-phenylene group is especially preferable, and Q′ is preferably a phenylene group, biphenylene group, or an atomic group expressed by the following formula

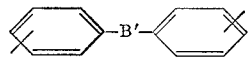

wherein B′ is a methylene group or —O—.

Furthermore, according to the invention, partially cyclized polybenzimidazoles consisting of 37.5–90 mol percent of a benzimidazole structural unit expressed by the following formula

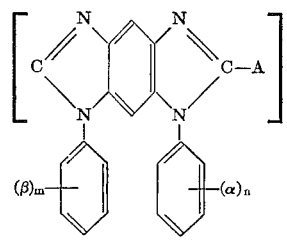

(23)

50–10 mol percent of an aromatic amide imine structural unit expressed by the following formula

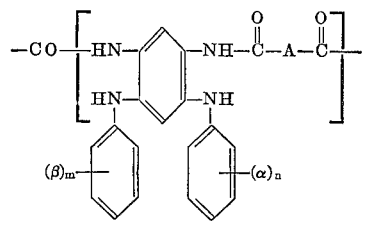

(24)

and 25–0 mol percent of a structural unit expressed by the general formula

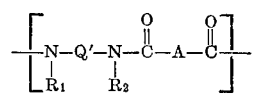

(20)

(in these formulae, the symbols are as defined below), the sum of the structural units (23) and (24), or the sum of the structural units (23), (24) and (20) being 100 mol percent, can be formed by cyclo-dehydrating, in accordance with the above-mentioned method, polyamide imines consiting of 75–100 mol percent of an aromatic amide imine structural unit expressed by the following formula

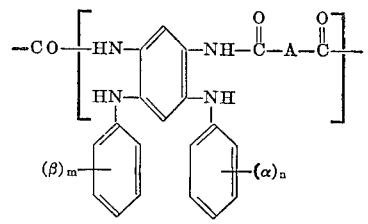

(22)

wherein A is a divalent aromatic group; two

groups are bonded to nuclear carbon atoms at positions other than adjacent or peri positions of the aromatic group A; α and β may be the same or different and represent a halogen atom or a non-reactive atomic group such as an alkyl group; and n and m represent an integer of 0–2, and 0–25 mol percent of a structural unit expressed by the following formula

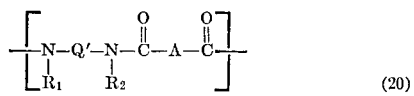
(20)

wherein Q' represents a phenylene group, biphenylene group, naphthylene group or a group of the formula

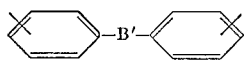

in which B' denotes an alkylene group having 1–3 carbon atoms, $-O-$, $-S-$, $-SO_2-$ or $\underset{\|}{-\underset{O}{C}-}$ $R_1$ and $R_2$ may be the same or different and represent a hydrogen atom or a methyl group; $-NR_1-$ and $-NR_2-$ are bonded to nuclear carbon atoms at positions other than adjacent or peri positions of the aromatic nucleus Q'; and A is as defined above, whereby 50–90% of the said aromatic amide imine structural unit is converted into a benzimidazole ring.

As the group A in the above Formulae 23, 24 and 20, a p-phenylene group or m-phenylene group is preferable, and as group Q' in Formula 20, a phenylene group, diphenylene group or an atomic group of the formula

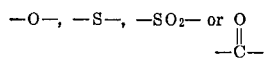

in which B is a methylene group or $-O-$ is preferable.

The actual operation of the cyclo-dehydration of the invention will be carried out in the following manner.

The polyamide imines of the invention can be subjected to heat cyclo-dehydration in the forms of powder, flake, irregularly crushed particles, or solids shaped from the polyamide imine solutions such as films fibers, coating and other shaped articles. As a heating medium, both liquid and gas can be used so long as they are inert to the aromatic polyamide imines and do not dissolve them. Generally preferable are air, inert gases such as nitrogen and carbon dioxide gas and liquid mediums such as Dowtherm and silicone.

If it is desired to dissolve the obtained polybenzimidazole into an organic solvent, it is preferable that the heat cyclization should be carried out in a condition free from air, such as in an inert gas or under vacuum. It is also possible to cyclo-dehydrate the aromatic polyamide imine in the form of its solution in an organic solvent, and thus convert it into a polybenzimidazole. In this case, the use of an acidic catalyst is preferable. For instance, a solution of the polybenzimidazole can be obtained by using a solvent for both the aromatic polyamide imine and polybenzimidazole and a small amount of an acidic catalyst such as hydrochloric acid and p-toluenesulfonic acid, and heating at a temperature above 60° C., preferably a temperature in the range of 80° C. to the boiling point of the solvent.

Furthermore, when a solid aromatic polyamide imine or a solution of it in an inert organic solvent is added to such an acidic solvent as formic acid, dichloroacetic acid and trifluoroacetic acid in which the polybenzimidazole of the invention is soluble, and the mixture is heated and cyclo-dehydrated, a resulting polybenzimidazole is gradually dissolved in said acidic solvent with the progress of the cyclo-dehydration reaction, and the polybenzimidazole can be obtained in the form of solution. When the cyclo-dehydration reaction is carried out in a solution, water formed as by-product tends to induce the hydrolysis of the polyamide imine. It is therefore preferable that the heating conditions for the cyclo-dehydration reaction should be relatively mild.

According to the invention, a shaped article of properly cyclized polybenzimidazole can be obtained by heating a solution of the aromatic polyamide imine while shaping it (for instance, shaping into films by a casting method), and after shaping, the shaped article may further be subjected to the cyclo-dehydration. As a matter of course, the cyclo-dehydration reaction can be promoted by adding a suitable acidic substance.

The N-aryl substituted polybenzimidazoles of the invention are excellent in heat resistance, being durable to a long time use at 200° C. for instance, good in resistance to an oxidizing atmosphere and stable to various chemicals such as acids or alkalies, and can be shaped into articles having extremely excellent mechanical and electrical characteristics. Shaped articles from the polybenzimidazoles of the invention are useful as coatings, films, fibers and other articles.

Most of the N-aryl substituted polybenzimidazoles of the invention are soluble in formic acid or dichloroacetic acid. Some of them are even soluble in m-cresol, dimethyl sulfoxide, N-methyl-2-pyrrolidone or N,N-dimethyl acetamide. For this reason, they are easily shaped into various articles.

Incidentally, the structures of the aromatic polyamide imines and N-aryl substituted polybenzimidazoles of the invention which are expressed by the above general formulas have been confirmed by elemental analysis or infrared absorption spectra as shown in the examples which follow.

Hereinafter the invention will be explained in further details, with reference to the working examples which are not to be construed as limiting the scope of the invention in any way, but are given exclusively for illustrative purpose.

In the examples, the polymer concentrations (percent) are expressed by gram numbers of the polymer weight in 100 ml. of solvent. Inherent viscosities ($\eta_{inh}$) are those measured at 30° C., which are determined in accordance with the following formula:

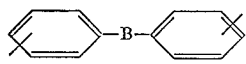

The relative viscosity ($\eta_{rel}$) may be determined by dividing the flow time in an Ostwald viscometer of a dilute solution of the polymer by the flow time for the pure solvent. In the formula above, C stands for concentration.

Unless otherwise specified, the inherent viscosities given in the examples were determined as to dimethylformamide solutions of the polymers at a concentration of 0.5 g./100 ml.

Also the falling-ball rate is expressed by the number of seconds required for a steel ball of ⅛ inch in diameter to fall through a distance of 10 cm. in a glass tube of 2 cm. in diameter, which is filled with the polymer solution of 30° C.

The thermal gravimetric analysis was performed at the rate of temperature rise of 5° C./min. in the air.

CONTROL

In a three-necked flash of 50 ml. capacity equipped with a sealer stirrer and calcium chloride cylinder, 10 ml. of N-methyl-2-pyrrolidone and 0.995 g. (0.005 mol) of 4,4'-diaminodiphenylamine were mixed by stirring and converted to a homogeneous solution. The solution was cooled with ice from outside, and to which 1.015 g. (0.005 mol) of isophthaloyl chloride was added under stirring. Approximately 15 minutes thereafter gelation of the system took place, and the resultant polymer was cross-linked and solvent-insoluble.

EXAMPLE 1

In a three-necked flash of 100 ml. capacity equipped with a sealed stirrer and calcium chloride cylinder, 15 ml. of N-methyl-2-pyrrolidone and 1.99 g. (0.01 mol) of 2,4-diaminodiphenylamine were mixed by stirring, and converted to a homogeneous solution. While cooling the solution with ice from outside, 2.03 g. (0.01 mole) of terephthaloyl chloride was added to the system under stirring. The cooling with ice was continued until the initial exothermic reaction terminated, and thereafter the reaction was allowed to advance at room temperature.

The viscosity of the solution gradually increased. After 5 hours' reaction, the reaction liquid was transferred into water in order to separate the polymer. Thus separated polymer was thoroughly washer with dilute aqueous sodium carbonate, distilled water, methanol, etc. and dried at reduced pressure. The polymer yield was quantitative. The polymer was yellowish brown in color, and the inherent viscosity ($\eta_{inh}$) of 0.2% dimethylsulfoxide solution thereof was 0.76. The polymer furthermore was soluble in organic polar solvents such as N-methyl-2-pyrrolidone, dimethylformamide, N,N-dimethylacetamide, dimethylsulfoxide, m-cresol, etc.

According to observations on a hot plate, the polymer was not softened at temperatures below 400° C. A weight decrease of the polymer due to cyclo-dehydration was observed at around 250° C. in the thermal gravimetric analysis, but thereafter substantially no weight reduction took place up to 430° C. The polymer retained no less than 75% of its initial weight at 550° C.

The infrared absorption spectrum of the polymer clearly showed the absorption by —NH— group at 3300–3200 cm.$^{-1}$, and the characteristic absorption bands of

group at 1660 cm.$^{-1}$ and 1530 cm.$^{-1}$. The elementary analysis values of the polymer were C: 70.07%, H: 5.10%, and N: 12.22%, which generally correspond with the theoretical values of C: 72.93%, H: 4.59% and N: 12.76%. Those results confirmed that the polymer possessed polyamide imine structure.

EXAMPLE 2

An amine solution consisting of 1.99 g. (0.01 mol) of 2,4-diaminodiphenylamine and 50 ml. of tetrahydrofuran, and an aqueous solution consisting of 2.12 g. (0.02 mol) of sodium carbonate and 42 ml. of water, were prepared and violently mixed in a Waring Blendor. Into the resultant mixture then a solution consisting of 2.03 (0.01 mol) of terephthaloyl chloride and 17 ml. of tetrahydrofuran was added, and reacted for 10 minutes under stirring. The reaction was performed at room temperature, and at the end of the reaction time, the polymer precipitation was completed by addition of water to the system. Thus yellowish brown polyamide imine was obtained with a yield of 93%, through the steps of filtration, washing and drying of the precipitate. The product had an inherent viscosity ($\eta_{inh}$) of 0.98 as measured under the identical conditions to those described in Example 1. The infrared absorption spectrum, solubility, thermal properties, etc. of the polyamide imine well coincided with those of the polymeric product of Example 1.

This polyamide imine powder was heated in the vacuum of approximately 0.5 mm. Hg for 5 hours at 280–290° C. to cause ring closure. Little change in appearance took place except the color was changed to light yellow, but the infrared absorption spectrum showed a decrease in characteristic absorption of amide radical, and also clearly showed the presence of characteristic absorptions of N-phenyl-substituted benzimidazole at 1630 cm.$^{-1}$, 1350 cm.$^{-1}$, 1380 cm.$^{-1}$, 970 cm.$^{-1}$, and 770 cm.$^{-1}$, etc.

In order to determine the degree of ring closure, separately an authentic sample of polyamidebenzimidazole, of which ring closure was completed, was prepared by dissolving the above polyamide imine in 116% polyphosphoric acid and heating the same. The comparison of the infrared absorption spectra of the sample and the product of Example 2 revealed perfect coincidence, which proved the ring closure by the above-specified heating to be substantially complete. The elementary analysis values (C: 74.78%, H: 4.51%, N: 12.83%) generally corresponded with theoretical values (C: 77.17%, H: 4.18%, N: 13.50%).

Thus obtained polyamidebenzimidazole was soluble in formic acid, dichloroacetic acid, N-methyl-2-pyrrolidone, dimethylacetamide, dimethylformamide, etc. The inherent viscosity of the product in N-methyl-2-pyrrolidone was 2.54. The thermal gravimetric analysis detected substantially no weight decrease in the polymer up to 430° C., which indicates excellent heat stability of the product.

EXAMPLE 3

Following the procedures described in Example 1, 1.33 g. (0.0067 mol) of 2,4-diaminodiphenylamine and 1.36 g. (0.0067 mol) of isophthaloyl chloride were polymerized in 10 ml. of N,N-dimethylacetamide. A greyish yellow polymer was obtained substantially quantitatively, which had an inherent viscosity of 0.48 which was measured in the similar manner to Example 1. The polymer was soluble in organic polar solvents such as N-methyl-2-pyrrolidone, dimethylformamide, N,N-dimethylacetamide, dimethylsulfoxide, etc. Those solutions could be shaped into strong, light yellowish brown and transparent film. The polymer exhibited no softening at temperatures below 400° C. when observed on a hot plate. A weight decrease of the polymer due to cyclo-dehydration was observed at around 200° C. according to thermal gravimetric analysis, but thereafter substantially no weight reduction took place up to 400° C. The polymer retained no less than 70% of the initial weight at 500° C.

The results of infrared absorption analysis and elementary analysis substantiated the polyamide imine structure of the product, similarly to Example 1.

EXAMPLE 4

A solution consisting of 1.45 g. (0.005 mol) of 1,3-diamino-4,6-dianilinobenzene, 1.01 g. (0.01 mol) of triethylamine, and 35 ml. of tetrahydrofuran was prepared, and into which 1.02 g. (0.005 mol) of isophthaloyl chloride was added under violent agitation. The reaction was continued for 45 minutes at room temperature. The resultant yellowish orange reaction mixture in slurry form was transferred into water, to be separated of the polymer. A light yellow polymer having an inherent viscosity of 0.35 was quantitatively obtained, which was soluble in such solvents as N-methyl-2-pyrrolidone, N,N-dimethylacetamide and dimethylsulfoxide. The polymer did not soften below 400° C. on a hot plate. A weight decrease of the polymer due to cyclo-dehydration was observed at around 270° C. according to thermal gravimetric analysis, but thereafter substantially no weight reduction was detected up to 510° C. Thus the polymer exhibited an excellent heat stability.

The infrared absorption spectrum of the polymer clearly showed the absorption bands of —NH— group at 3300–3200 cm.$^{-1}$, and characteristic absorptions of

group at 1660 cm.$^{-1}$ and 1530 cm.$^{-1}$. The elementary analysis values (C: 74.03%, H: 4.98%, N: 13.14%) generally corresponded with theoretical values (C: 74.27%, H: 4.79%, N: 13.33%). These results indicate that the product polymer possessed polyamide imine structure.

The product powder was heated at 360° C. for 3.5 hours in a vacuum of approximately 0.5 mm. Hg, to cause cyclo-dehydration. No appreciable change took place in appearance except that the color became lighter, but the solubility was changed. That is, the heated product was insoluble in the aforesaid amide solvents, but was soluble in formic acid and dichloroacetic acid. Its inherent viscosity measured with 0.5% solution in formic acid was 1.22.

The characteristic absorptions caused by amide at 3300 cm.$^{-1}$, 1600 cm.$^{-1}$, 1530 cm.$^{-1}$, and 1300 cm.$^{-1}$, etc. which were present in the spectrum of the precursor, polyamide imine, disappeared from the infrared absorption spectrum of the heated product. Instead, the characteristic absorptions of N-phenyl-substituted benzimidazole ring strongly appeared at 1630 cm.$^{-1}$, 1350 cm.$^{-1}$, 1390 cm.$^{-1}$ and 970 cm.$^{-1}$, etc. This indicated that the cyclization was substantially complete.

The elementary analysis values of the cyclized polymer were as follows, C: 80.02%, H: 4.50%, and N: 14.11%, which well corresponded with the theoretical values (C: 81.25%, H: 4.36%, N: 14.59%). Thus the polymer was identified to be polybenzimidazole.

The polybenzimidazole showed substantially no weight reduction up to 510° C. according to thermal gravimetric analysis, as a proof of its excellent heat stability.

EXAMPLE 5

In accordance with the procedures of Example 1, 1.45 g. (0.005 mol) of 1,3-diamino-4,6-dianilinobenzene and 1.02 g. (0.005 mol) of terephthaloyl chloride were polymerized in 10 ml. of N-methyl-2-pyrrolidone. Yellow polyamide imine was quantitatively obtained, which had an inherent viscosity of 0.35, when measured in the similar manner to Example 4. The product's infrared absorption spectrum, thermal properties and solubility were identical to those of the polyamide imine obtained in Example 4.

EXAMPLE 6

Example 5 was repeated except that the terephthaloyl chloride was replaced by isophthaloyl chloride.

A light yellow polyamide imine was quantitatively obtained, which had an inherent viscosity of 0.27 when measured in the similar manner to Example 4. The polymer was soluble in N-methyl-2-pyrrolidone, N,N-dimethylacetamide, dimethylsulfoxide, dimethylformamide, etc. The polymer did not soften below 400° C. when observed on a hot plate. Also according to thermal gravimetric analysis, a weight decrease in the polymer due to cyclo-dehydration was observed from around 250° C. However substantially no weight reduction was recognizable thereafter up to 450° C. Thus the polymer exhibited excellent heat stability.

EXAMPLE 7

An amine solution consisting of 1.45 g. (0.005 mol) of 1,3-diamino-4,6-dianilinobenzene and 40 ml. of tetrahydrofuran; and an aqueous solution consisting of 1.06 g. (0.01 mol) of sodium carbonate and 30 ml. of water; were prepared and violently mixed in a Waring Blendor. Into the mixture then a solution consisting of 1.02 g. (0.005 mol) of terephthaloyl chloride and 15 ml. of tetrahydrofuran was added, followed by 10 minutes of continuous stirring. The reaction was performed at room temperature, and at the end of the reaction time water was added to the system to complete the polymer precipitation. A yellow polyamide imine was substantially quantitatively obtained through the steps of filtration, washing and drying of the precipitate. The 0.5% dimethylsulfoxide solution of the polymer showed an inherent viscosity of 0.79. The polymer's infrared absorption spectrum, thermal properties and solubility were identical to those of the polymer obtained in Example 4.

EXAMPLE 8

In accordance with the procedures described in Example 1, 4.30 g. (0.01 mol) of 3,3'-diamino-4,4'-dianilinodiphenylsulfone and 2.03 g. (0.01 mol) of terephthaloyl chloride were polymerized in 20 ml. of N-methyl-2-pyrrolidone.

The resultant polyamide imine having an inherent viscosity of 0.32 was light yellow in color, and was soluble in N-methyl-2-pyrrolidone, N,N-dimethylacetamide, dimethylsulfoxide, dimethylformamide, etc. The polymer did not soften at temperatures below 400° C. when observed on a hot plate. Also according to thermal gravimetric analysis, a weight decrease of the polymer was observed at around 250° C. due to cyclo-dehydration, but thereafter substantially no weight reduction took place up to around 500° C. Thus the polymer exhibited excellent heat stability.

In the infrared absorption spectrum of the polymer, absorption of —NH— group in the vicinity of 3300 cm.$^{-1}$, characteristic absorptions of

group at 1660 cm.$^{-1}$ and 1530 cm.$^{-1}$, and characteristic absorption of —SO$_2$— group at 1150 cm.$^{-1}$ were clearly present. The elementary analysis values of the polymer (C: 66.79%, H: 4.59%, N: 9.80% and S: 5.50%) well corresponded with the theoretical values (C: 68.25%, H: 4.65%, N: 9.95%, S: 5.69%). These results indicated that the product polymer was composed of polyamide imine structure having sulfone groups.

EXAMPLES 9–24

Following the procedures described in Example 1, each 0.01 mol of triamines and tetramines were polymerized with each 0.01 mol of aromatic dicarbonyl chlorides at the specific combinations indicated in Table 1, in the specified solvent. The polymer yields were quantitative in all cases. The inherent viscosities and elementary analysis values of the resultant polymers were as given in Table 2. In case hydrochloride of triamine or tetramine was used as the starting material, triethylamine of an equimolar quantity to the hydrochloric acid content of the amine salt was added to the system.

TABLE 1

| Example No. | Triamine or Tetramine | Aromatic dicarbonyl chloride | Reaction solvent | Ml. |
|---|---|---|---|---|
| 9 | 2,4-diaminodiphenylamine | 4,4'-dibenzoyl chloride | N-MP | 20 |
| 10 | do | 4,4'-sulfonyldibenzoyl chloride | N-MP | 20 |
| 11 | do | Isocynchomeronyl chloride | N-MP | 20 |
| 12 | do | 2,6-naphthalenedicarbonyl chloride | N-MP | 20 |
| 13 | do | Terephthaloyl chloride (50%) / Isophthaloyl chloride (50%) | N-MP | 20 |
| 14 | 1-anilino-2,4-diaminonaphthalene | Terephthaloyl chloride | DMAc | 20 |
| 15 | 3,6-dimethyl-2,4-diaminodiphenylamine dihyrochlroide | do | NMP / TEA | 25 |
| 16 | 5-chloro-2,4-diaminodiphenylamine | do | NMP | 20 |
| 17 | 4'-chloro-2,4-diaminodiphenylamine | do | NMP | 20 |
| 18 | 4-(2,4-diaminoanilino)-biphenyl | do | NMP | 20 |
| 19 | 4'-methyl-2,4-diaminodiphenylamine dihydrochloride | do | N-MP / TEA | 25 |
| 20 | 1,3-di-p-toluidino-4,6-diamino benzene | do | N-MP | 20 |
| 21 | 4,4'-dianilino-3,3'dminodiaphenyl dihydrochloride | do | N-NP / TEA | 30 |
| 22 | 4,4'-dianilino-3,3'-diaminodiphenylmethane | do | N-MP | 20 |
| 23 | 4,4'-dianilino-3,3'-diaminodiphenylether | do | N-MP | 20 |
| 24 | 4,4'-dianilino-3,3'-diaminobenzophenone | do | N-MP | 20 |

TABLE 2

| Example No. | Inherent viscosity of polymer ($\eta_{inh}$) | Elementary analyses of polymers | | | | | |
|---|---|---|---|---|---|---|---|
| | | Measured | | | Calculated | | |
| | | C | H | N | C | H | N |
| 9 | 0.32 | 75.03 | 4.93 | 10.12 | 77.02 | 4.72 | 10.37 |
| 10 | 0.38 | 65.10 | 4.23 | 8.74 | 66.51 | 4.08 | 8.95 |
| 11 | 0.45 | 68.12 | 4.35 | 16.84 | 69.08 | 4.27 | 16.96 |
| 12 | 0.75 | 75.01 | 4.60 | 10.94 | 75.97 | 4.52 | 11.08 |
| 13 | 0.42 | 74.05 | 4.90 | 10.73 | 75.97 | 4.52 | 11.08 |
| 14 | 0.60 | 71.34 | 4.32 | 12.40 | 72.93 | 4.59 | 12.76 |
| 15 | 0.30 | 72.10 | 5.40 | 11.13 | 73.93 | 5.36 | 11.76 |
| 16 | 0.72 | 63.95 | 4.01 | 8.48 | 66.02 | 3.87 | 8.80 |
| 17 | 0.75 | 65.46 | 3.96 | 8.62 | 66.02 | 3.87 | 8.80 |
| 18 | 0.40 | 76.34 | 5.11 | 10.15 | 77.02 | 4.72 | 10.37 |
| 19 | 0.31 | 71.56 | 5.20 | 11.89 | 73.02 | 5.55 | 12.17 |
| 20 | 0.30 | 72.58 | 5.80 | 12.18 | 74.98 | 5.39 | 12.49 |
| 21 | 0.25 | 74.83 | 5.13 | 11.16 | 77.40 | 4.87 | 11.28 |
| 22 | 0.41 | 76.20 | 5.02 | 10.85 | 77.63 | 5.13 | 10.97 |
| 23 | 0.32 | 72.42 | 4.95 | 10.54 | 74.98 | 4.72 | 10.93 |
| 24 | 0.40 | 73.21 | 4.87 | 10.42 | 75.56 | 4.61 | 10.68 |

The polymers obtained in Examples 9 through 24 were colored with various tones ranging from light yellow to yellowish brown, and soluble in N,N-dimethylacetamide, N,N-dimethylformamide, N-methyl-2-pyrrolidone, dimethylsulfoxide and hexamethylphosphoramide. None of the polymers softened at temperatures below 300° C. on a hot plate. According to thermal gravimetric analysis, weight decreases of the polymers due to cyclo-dehydration were observed at around 250° C., but thereafter appreciable weight reduction did not take place up to approximately 430° C. as to the polymers from triamine, and approximately 500° C. with the polymers from tetramine. All of the infrared absorption spectra of the polymers showed conspicuous —NH— group absorption bands at 3300–3200 cm.$^{-1}$, and characteristic —CONH— group absorption bands at 1660 cm.$^{-1}$ and 1530 cm.$^{-1}$. These results as well as the elementary analysis values given in Table 2 proved that those polymers were composed of polyamide imine structure. In the above Table 1, DMAc, N–MP and TEA respectively stand for N,N-dimethylacetamide, N-methyl-2-pyrrolidone, and triethylamine.

EXAMPLES 25–27

Following the procedures described in Example 2, each 3.98 g. (0.02 mol) of 2,4-diaminodiphenylamine was reacted with 0.02 mol of dicarboxylic acid dichloride specified in Table 3 to produce polyamide imines. Types and quantities of the reactants and inherent viscosities of the resultant polymers are collectively given in Table 3. The infrared absorption spectra, thermal properties, solubilities, etc. of the product polymers well corresponded with the respective properties of the polymers obtained in Examples 9, 10 and 12.

EXAMPLE 28

A solution consisting of 3.98 g. (0.02 mol) of 2,4-diaminodiphenylamine and 40 ml. of methyl ethyl ketone; and an aqueous solution consisting of 4.24 g. (0.04 mol) of sodium carbonate and 60 ml. of water; were prepared and mixed with high speed stirring in a Waring Blendor. Then a solution consisting of 4.06 g. (0.02 mol) of terephthaloyl chloride and 20 ml. of methyl ethyl ketone (of which water content was reduced to 4–5 mg./100 ml. by dehydration with a molecular sieve) was added into the system at once, and the agitation was continued for additional 5 minutes to effect the polymerization. Through the steps of filtration, washing and drying of the precipitate, a bright yellow, fine powdery polyamide imine was obtained substantially quantitatively. The polymer had an inherent viscosity of 1.41, and exhibited the properties identical to those of the product of Example 1.

EXAMPLES 29–37

Example 28 was repeated except that the quantity of the solvent and the type of reactants were varied each time as indicated in Table 4. The inherent viscosities of the resultant polyamide imines are also given in Table 4.

TABLE 4

| | Amine solution | | | Acid Chloride Solution | | | Aqueous Phase | | | Inherent viscosity of Polymer ($\eta_{inh}$) |
|---|---|---|---|---|---|---|---|---|---|---|
| Ex. No. | Amt. of Amine | (mole) | Amt. of MEK (ml.) | Amt. of acid chloride | (mole) | Amt. of MEK (ml.) | Amt. of Na$_2$CO$_3$ (mole) | Amt. of water (ml.) | | |
| 29 | 2,4-DADPA | 0.02 | 40 | IPCl | 0.02 | 20 | 0.04 | 60 | | 0.72 |
| 30 | 2,4-DADPA | 0.02 | 40 | IPCl / TPCl | 0.015 / 0.005 | 20 | 0.04 | 60 | | 0.74 |
| 31 | 2,4-DADPA | 0.08 | 150 | IPCl / TPCl | 0.056 / 0.024 | 60 | 0.18 | 210 | | 0.88 |
| 32 | 2,4-DAPA | 0.02 | 40 | IPCl / TPCl | 0.01 / 0.01 | 20 | 0.04 | 60 | | 0.78 |
| 33 | 2,4-DAPA | 0.02 | 40 | IPCl / TPCl | 0.005 / 0.015 | 20 | 0.04 | 60 | | 0.82 |
| 34 | 2,4-DADPA | 0.02 | 40 | Pyridine-2, 5-dicarbonyl chloride | 0.02 | 20 | 0.04 | 60 | | 0.60 |
| 35-A | 4'-chloro-2,4-DADPA | 0.01 | 35 | TPCl | 0.01 | 15 | 0.02 | 50 | | 1.21 |
| 35-B | 2,4-DADPA / 4'chloro-2,4-DADPA | 0.005 / 0.015 | 60 | TPCl | 0.02 | 20 | 0.04 | 80 | | 0.95 |
| 36 | 4-(2,4-diaminoanilino)-diphenyl | 0.01 | 42 | TPCl | 0.01 | 10 | 0.02 | 55 | | 0.44 |
| 37 | 1-anilino-2,4-diaminonaphthalene | 0.01 | 30 | TPCl | 0.01 | 14 | 0.02 | 50 | | 0.44 |

NOTE.—MEK=Methyl ethyl ketone; 2,4-DADPA=2,4-diaminodiphenylamine; IPCL=Isophthaloyl chloride; TPCl=Terephthaloyl chloride.

EXAMPLES 38–41

Example 28 was repeated except that the r.p.m. of Waring Blendor was varied each time. The r.p.m. of the blender and inherent viscosities of the resultant polyamide imines are given in Table 5. Within the scope of present examples, it can be understood that the inherent viscosities are not influenced by the r.p.m. of blender.

TABLE 5

| Example No. | R.p.m. of Waring Blendor | Inherent Viscosity of Polymer ($\eta_{inh}$) |
|---|---|---|
| 38 | 1,500 | 0.96 |
| 39 | 3,000 | 1.02 |
| 40 | 8,700 | 1.02 |
| 41 | 14,000 | 0.98 |

EXAMPLES 42–48

By the similar operational procedures described in Example 28, the polymerization was performed from 4.06 g. of terephthaloyl chloride, 3.98 g. of 2,4-diaminodiphenylamine and 4.24 g. of sodium carbonate, with the quantity of solvent varied in each run. The quantities of the solvent and inherent viscosities of the resultant polymers are given in Table 6. From the same table, it can be

TABLE 3

| | Amine solution | | Acid chloride solution | | | Aqueous phase | | Inherent viscosity of polymer ($\eta_{inh}$) |
|---|---|---|---|---|---|---|---|---|
| Example No. | Amt. of 2,4-DADPA (g.) | Amt. of THF (ml.) | Amt. of acid chloride | (grams) | | Amt. of Na$_2$CO$_3$ (g.) | Amt. of water | |
| | | | | | Amt. of THF (ml.) | | | |
| 25 | 3.98 | 70 | 4,4'-dibenzoyl chloride | 4.58 | 55 | 4.24 | 120 | 0.32 |
| 26 | 3.98 | 80 | 4,4'-sulfonyldibenzoyl chloride | 5.86 | 50 | 4.24 | 160 | 0.31 |
| 27 | 3.98 | 100 | 2,6-naphthalenedicarbonyl chloride | 5.06 | 88 | 4.24 | 200 | 0.78 |

NOTE.—2,4-DADPA=2,4-diaminodiphenylamine; THF=tetrahydrofuran.

understood that the concentration has little bearing on inherent viscosity, within the conditions employed in those examples.

TABLE 6

| Ex. No. | Methyl Ethyl Ketone (ml.) | | Water content of aqueous sodium carbonate (ml.) | Inherent viscosity of polymer ($\eta_{inh}$) |
|---|---|---|---|---|
| | Terephthaloyl chloride solution | 2,4-diamino-diphenylamine solution | | |
| 42 | 40 | 40 | 80 | 1.00 |
| 43 | 30 | 40 | 70 | 0.96 |
| 44 | 20 | 30 | 50 | 0.94 |
| 45 | 20 | 40 | 60 | 0.99 |
| 46 | 20 | 60 | 80 | 0.99 |
| 47 | 20 | 80 | 100 | 0.98 |
| 48 | 20 | 100 | 120 | 1.01 |

EXAMPLES 49-54

By he similar operational procedures described in Example 28, 3.98 g. (0.02 mol) of 2,4-diaminodiphenylamine and 4.06 g. (0.02 mol) of terephthaloyl chloride were polymerized, with the type and quantity of the acid acceptor varied in each run. The results are shown in Table 7. The polyamide imines were obtained substantially quantitatively in all cases. From the results given, it can be understood that the inherent viscosity of the polymer is not appreciably affected by he degree of basicity of the inorganic acid acceptor employed.

TABLE 7

| Example No. | Acid Acceptor | | Inherent viscosity of polymer ($\eta_{inh}$) |
|---|---|---|---|
| | Type | Quantity (mol) | |
| 49 | Sodium carbonate | 0.04 | 0.78 |
| 50 | do | 0.08 | 0.85 |
| 51 | do | 0.035 | 0.83 |
| 52 | do | 0.02 | 0.80 |
| 53 | Sodium bicarbonate | 0.04 | 0.77 |
| 54 | Caustic soda | 0.04 | 0.84 |

EXAMPLES 55-62

As a means for controlling the degree of polymerization, variation in mol ratio of amine to acid chloride was experimented. Under the same conditions employed in Example 28, the polymerization of terephthaloyl chloride and 2,4-diaminodiphenylamine was performed. From the results given in Table 8, it can be understood that the tested method is useful for controlling the degree of polymerization.

TABLE 8

| Example No. | Quantities of Monomers (mol) | | Inherent viscosity of polymer ($\eta_{inh}$) |
|---|---|---|---|
| | Terephthaloyl chloride | 2,4-diamino-diphenylamine | |
| 55 | 0.0204 | 0.0200 | 0.82 |
| 56 | 0.0210 | 0.0200 | 0.60 |
| 57 | 0.0220 | 0.0200 | 0.40 |
| 58 | 0.0240 | 0.0200 | 0.25 |
| 59 | 0.0200 | 0.0204 | 0.54 |
| 60 | 0.0200 | 0.0210 | 0.37 |
| 61 | 0.0200 | 0.0220 | 0.25 |
| 62 | 0.0200 | 0.0240 | 0.18 |

Thus prepared polyamide imines were dissolved in dimethylformamide and moulded into films. Some of the films containing excessive terephthalic acid gave infrared absorption spectra which showed absorption by carbonyl group of the carboxylic acid in the vicinity of 1700–1710 cm.$^{-1}$. Whereas, those polymers containing excessive amine showed coloration ranging from yellow to yellowish brown, in accordance with the excessive quantity of amine.

EXAMPLES 63-67

Monofunctional benzoyl chloride was added to the acid chloride component for the purpose of controlling the degree of polymerization. All of the other conditions were identical to those of Example 28. The correlation between the quantity of benzoyl chloride added and the inherent viscosity of the product polymer is illustrated in Table 9.

TABLE 9

| Ex. No. | Quantity of acid chloride component (mol) | | Quantity of 2,4-diaminodi-phenylamine (mol) | Inherent viscosity of polymer ($\eta_{inh}$) |
|---|---|---|---|---|
| | Terephthaloyl chloride | Benzoyl chloride | | |
| 63 | 0.0200 | 0 | 0.0200 | 0.95 |
| 64 | 0.0196 | 0.0008 | 0.0200 | 0.56 |
| 65 | 0.0190 | 0.0020 | 0.0200 | 0.35 |
| 66 | 0.0180 | 0.0040 | 0.0200 | 0.25 |
| 67 | 0.0160 | 0.0080 | 0.0200 | 0.15 |

In order to confirm the reproducibility of the above results, polymerization was repeated fourteen times under identical conditions, employing 15.915 g. (0.0784 mol) of terephthaloyl chloride, 0.4496 g. (0.0032 mol) of benzoyl chloride, 16.96 g. (0.16 mol) of 2,4-diaminodiphenylamine and 16.96 g. (0.16 mol) of sodium carbonate. The results were as given in Table 10, showing excellent reproducibility.

TABLE 10

| Run No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Inherent viscosity of polymer ($\eta_{inh}$) | 0.57 | 0.58 | 0.58 | 0.55 | 0.57 | 0.54 | 0.53 | 0.58 | 0.60 | 0.59 | 0.61 | 0.57 | 0.61 | 0.61 |

EXAMPLES 68-72

Monofunctional aniline was added to the amine component in the purpose of controlling the degree of polymerization. The polymerization reaction was performed in accordance with the procedures of Example 28. The correlation between the quantity of aniline added and the inherent viscosity ($\eta_{inh}$) of the product polymer is illustrated in Table 11.

TABLE 11

| Example No. | Quantity of terephthaloyl chloride (mol) | Quantity of amine component (mol) | | Inherent viscosity of polymer ($\eta_{inh}$) |
|---|---|---|---|---|
| | | 2,4-diaminodi-phenylamine | Aniline | |
| 68 | 0.0200 | 0.0200 | 0 | 0.95 |
| 69 | 0.0200 | 0.0196 | 0.0008 | 0.47 |
| 70 | 0.0200 | 0.0190 | 0.0020 | 0.34 |
| 71 | 0.0200 | 0.0180 | 0.0040 | 0.24 |
| 72 | 0.0200 | 0.0160 | 0.0080 | |

In order to confirm the reproducibility of the above result, the polymerization was repeated ten times under identical conditions, using 16.24 g. (0.08 mol) of terephthaloyl chloride, 15.60 g. (0.0784 mol) of 2,4-diaminodiphenylamine, 0.2976 g. (0.0032 mol) of aniline and 16.96 g. (0.16 mol) of sodium carbonate. The results were as given in Table 12.

TABLE 12

| Run No. | 1 | 2 | 3 | 4 | 5 | 6 | 7 | 8 | 9 | 10 |
|---|---|---|---|---|---|---|---|---|---|---|
| Inherent viscosity of polymer ($\eta_{inh}$) | 0.53 | 0.53 | 0.55 | 0.54 | 0.53 | 0.50 | 0.54 | 0.54 | 0.54 | 0.52 |

Similarly to the case of benzoyl chloride addition in Examples 63–67, good controlling effect of degree of polymerization by the aniline addition was confirmed.

EXAMPLE 73

3.98 grams (0.02 mol) of 2,4-diaminodiphenylamine was dissolved in 40 ml. of anhydrous methyl ethyl ketone, and the solution was stirred in a Waring Blendor. Into the blender then a solution consisting of 4.06 g. (0.02 mol) of terephthaloyl chloride and 20 ml. of anhydrous methyl ethyl ketone was added. The resultant reaction product containing active oligomers was in the form of yellowish white emulsion. The stirring was continued for approximately a minute, and thereafter an aqueous solution consisting of 4.24 g. of sodium carbonate and 60 ml. of water was quickly added to the system with a raise in the stirring rate. The high speed stirring was continued for additional 5 minutes. After completion of the reaction, 250 ml. of water was added to the system in order to complete the precipitation of the polymer. By filtering, washing and drying the precipitate, a bright yellow, fine powdery polymer having an inherent viscosity of 1.28 was obtained. The properties of the polymer well coincided with those of the polymer obtained in Example 28.

Also a part of the active oligomers produced in the initial stage reaction was withdrawn and completely reprecipitated with water. The product had an inherent viscosity of 0.12.

EXAMPLES 74-79

Following the procedures described in Example 73 except that the type and quantity of solvent and quantity of water were varied as specified in Table 13 below, 3.98 g. (0.02 mol) of 2,4-diaminodiphenylamine and 4.06 g. (0.02 mol) of terephthaloyl chloride were polymerized in the presence of 4.24 g. (0.04 mol) of sodium carbonate. The inherent viscosities of the resultant polymers are also given in Table 13. The yields were quantitative in all cases, and the polymer properties well corresponded with those of the product of Example 28. The inherent viscosities of the active intermediate products were in all cases approximately 0.1.

The yield of the polymer was 5.9 g. (89%), and its inherent viscosity was as low as 0.15.

The above polymerization was repeated except that 8.1 g. of sodium chloride was added to the aqueous solution of sodium carbonate.

In the latter case no precipitation of amine was observed during the mixing of amine solution with the aqueous solution. The resultant polymer was in the form of yellow powder. Washing of the polymer with hot water neither caused elution of amine. The polymer yield was 6.5 g. which was substantially quantitative, and the inherent viscosity of the polymer was 0.60. Thus the effect of a neutral salt addition was conspicuous.

EXAMPLES 81-86

In the similar manner described in Example 73, an amine solution consisting of 3.98 g. (0.02 mol) of 2,4-diaminodiphenylamine and 40 ml. of anhydrous acetone and an acid chloride solution consisting of 4.06 g. (0.02 mol) of terephthaloyl chloride and 40 ml. of anhydrous acetone were mixed and reacted. The resultant mixture containing active intermediate products was further mixed with an aqueous solution composed of 4.24 g. of sodium carbonate and 80 ml. of water, in order to obtain a polymer. In that case, each indicated quantity of sodium chloride was added to the aqueous solution in each run, in order to determine the correlation between the quantity of sodium chloride and inherent viscosity of the resultant polymer. As indicated by the results given in Table 14, it can be understood that the addition of a suitable quantity of a neutral salt effectively improves the degree of polymerization of the product even in the two-stage process comprising the first step of forming active intermediate products, provided acetone is used as the reaction medium. Comparing with Example 80, these examples were characterized in that the polymer yields were quantitative regardless of the presence or absence of sodium chloride, and that unreacted amine never was eluted in the hot water washing.

TABLE 13

| | Reaction Solvent (ml.) | | | |
| --- | --- | --- | --- | --- |
| Example No. | Name | Amt. for Amine Solution | Amt. for Acid Chloride Solution | Amt. of water (ml.) | Inherent viscosity of polymer ($\eta_{inh}$) |
| 74 | Tetrahydrofuran | 40 | 20 | 60 | 1.55 |
| 75 | Cyclopentanone | 50 | 20 | 70 | 0.63 |
| 76 | Cyclohexanone | 50 | 20 | 70 | 0.31 |
| 77 | Ethyl acetate | 110 | 35 | 130 | 0.31 |
| 78 | Methyl-n-propylketone | 60 | 60 | 130 | 0.70 |
| 79 | Methyl-iso-butylketone | 100 | 50 | 150 | 0.36 |

EXAMPLE 80

An amine solution consisting of 3.98 g. (0.02 mol) of 2,4-diaminodiphenylamine and 27 ml. of acetone; and an aqueous solution consisting of 4.24 g. (0.04 mol) of sodium carbonate and 40 ml. of water; were prepared and mixed with high speed stirring in a Waring Blendor. Immediately upon mixing, precipitation of amine was observed. Under the stirring, a solution consisting of 4.06 g. (0.02 mol) of terephthaloyl chloride and 15 ml. of acetone was added to the system, followed by additional 5 minutes' stirring. At the end of the reaction time, water was added to complete the precipitation of polymer. Thus a blackish brown, powdery polymer was recovered. When the polymer was washed with hot water, the washing was colored reddish brown, indicating the presence of unreacted amine remaining in the polymer.

TABLE 14

| Example No. | Add. NaCl (g.) | (Inherent viscosity of polymer) ($\eta_{inh}$) |
| --- | --- | --- |
| 81 | 0 | 0.33 |
| 82 | 4.2 | 0.37 |
| 83 | 8.4 | 0.38 |
| 84 | 12.6 | 0.52 |
| 85 | 16.8 | 0.64 |
| 86 | 21.0 | 0.59 |

EXAMPLES 87-99

Example 28 was repeated except that a part of the 2,4-diaminodiphenylamine was replaced by an aromatic diamine. Thus copolymers of polyamide imines as specified in Table 15 were obtained. All of the copolymers did not soften at temperatures below 350° C. on a hot plate.

Their solubilities were substantially identical with those of the homopolymer containing no aromatic diamine.

EXAMPLE 105

2,4-diaminodiphenylamine and terephthaloyl chloride

TABLE 15

| Example No. | Amine solution | | | | Acid chloride solution | | | Aqueous phase | | Inherent viscosity of polymer ($\eta_{inh}$) |
|---|---|---|---|---|---|---|---|---|---|---|
| | Amt. of 2,4-DADPA (mol) | Amt. of diamine | | (mol) | Amt. of MEK (ml.) | Amt. of acid chloride | (mol) | Amt. of MEK (ml.) | Amt. of Na₂CO₃ (mol) | Amt. of water (ml.) |
| 87 | 0.016 | 4,4'-diaminodiphenylether | | 0.004 | 40 | IPCl | 0.02 | 20 | 0.04 | 60 | 0.70 |
| 88 | 0.016 | 4,4'-diaminodiphenylmethane | | 0.004 | 40 | IPCl | 0.02 | 20 | 0.04 | 60 | 0.54 |
| 89 | 0.016 | 3,3'-diaminodiphenylsulfone | | 0.004 | 40 | IPCl | 0.02 | 20 | 0.04 | 60 | 0.53 |
| 90 | 0.015 | 4,4'-diaminodiphenylether | | 0.005 | 40 | TPCl | 0.02 | 20 | 0.04 | 60 | 1.80 |
| 91 | 0.016 | 4,4'-diaminodiphenylmethane | | 0.004 | 40 | TPCl | 0.02 | 20 | 0.04 | 60 | 1.52 |
| 92 | 0.016 | 3,3'-diaminodiphenylsulfone | | 0.004 | 40 | TPCl | 0.02 | 20 | 0.04 | 60 | 1.22 |
| 93 | 0.016 | 1,5-naphthalenediamine | | 0.004 | 40 | TPCl | 0.02 | 20 | 0.04 | 60 | 1.06 |
| 94 | 0.016 | 4,4'-diaminodiphenylsulfone | | 0.004 | 40 | TPCl | 0.02 | 20 | 0.04 | 60 | 0.73 |
| 95 | 0.018 | 3,3'-dimethoxybenzidine | | 0.002 | 40 | TPCl | 0.02 | 20 | 0.04 | 60 | 0.82 |
| 96 | 0.018 | N-methylparaphenylenediamine | | 0.002 | 40 | TPCl | 0.02 | 20 | 0.04 | 60 | 0.74 |
| 97 | 0.016 | 4,4'-diaminodiphenylether | | 0.004 | 40 | TPCl / IPCl | 0.01 / 0.01 | 20 | 0.04 | 60 | 1.26 |
| 98 | 0.016 | 4,4'-diaminodiphenylmethane | | 0.004 | 40 | TPCl / IPCl | 0.01 / 0.01 | 20 | 0.04 | 60 | 1.11 |
| 99 | 0.016 | 3,3'-diaminodiphenylsulfone | | 0.004 | 40 | TPCl / IPCl | 0.01 / 0.01 | 20 | 0.04 | 60 | 1.02 |

NOTE.—2,4-DADPA=2,4-diaminodiphenylamine; TPCl=Terephthaloyl chloride; IPCl=Isophthaloyl chloride; MEK=Methyl ethyl ketone.

EXAMPLES 100 AND 101

Example 73 was repeated except that a part of the 2,4-diaminodiphenylamine was replaced by an aromatic diamine, to produce the polyamide imine copolymers as specified in Table 16. None of the polymers was softened at temperatures below 350° C., and their solubilities were substantially identical with those of the homopolymer containing no aromatic diamine.

were polymerized in accordance with Example 2, to produce a polyamide imine having an inherent viscosity of 0.65.

The same polymer was dissolved in dimethylformamide to a concentration of 40% at room temperature. The falling-ball rate of the solution was 125 seconds, indicating the considerably high viscosity of the solution.

The solution was spread on a glass sheet to a thickness

TABLE 16

| Example No. | Amine Solution | | | Acid Chloride Solution | | Aqueous Phase | | Inherent viscosity of polymer ($\eta_{inh}$) |
|---|---|---|---|---|---|---|---|---|
| | Amt. of 2,4-DADPA (mol) | Amt. of diamine (mol) | Amt. of MEK (ml.) | Amt. of TPCl (mol) | Amt. of MEK (mol) | Amt. of Na₂CO₃ (mol) | Amt. of water (ml.) | |
| 100 | 0.016 | m-Phenylenediamine (0.004) | 40 | 0.02 | 20 | 0.04 | 60 | 0.85 |
| 101 | 0.016 | p-Phenylenediamine (0.004) | 40 | 0.02 | 20 | 0.04 | 60 | 0.93 |

NOTE.—2,4-DADPA=2,4-diaminodiphenylamine; TPCl=Terephthaloyl chloride; MEK=Methyl ethyl ketone.

EXAMPLES 102–104

Example 2 was repeated except that a part of the triamine or tetramine was replaced by an aromatic diamine. Thus polyamide imine copolymers as specified in Table 17 were obtained. None of them was softened at temperatures below 350° C. when observed on a hot plate. The solubilities of the copolymers were substantially identical with those of the homopolymer containing no aromatic diamine.

of 150μ, and dried for an hour in nitrogen current at 80° C., and further for 8 hours at 100° C. at a reduced pressure. Thus a transparent, yellowish brown film was obtained. Thus shaped film had, a thickness of 40μ strength of 995 kg./cm.², and an elongation of 35%.

EXAMPLE 106

2,4-diaminodiphenylamine and terephthaloyl chloride were polymerized in the manner described in Example 2,

TABLE 17

| Ex. No. | Amt. of triamine or tetramine | | (mol) | Amt. of diamine | (mol) | Amt. of THF (ml.) | Amt. of TPCl (mol) | Amt. of THF (ml.) | Amt. of Na₂CO₃ (mol) | Amt. of water (ml.) | Inherent viscosity of polymer ($\eta_{inh}$) |
|---|---|---|---|---|---|---|---|---|---|---|---|
| 102 | 1,3-diamino-4,6-dianilinobenzene | | 0.016 | 4,4'-diaminodiphenylether | 0.004 | 50 | 0.02 | 20 | 0.04 | 70 | 0.71 |
| 103 | do | | 0.016 | 3,3'-diaminodiphenylsulfone | 0.004 | 55 | 0.02 | 20 | 0.04 | 75 | 0.68 |
| 104 | 2,4-diaminodiphenylamine | | 0.018 | N,N'-dimethyl-p-phenylenediamine | 0.002 | 40 | 0.02 | 20 | 0.04 | 60 | 0.67 |

NOTE.—TPCl=Terephthaloyl Chloride; THF=Tetrahydrofuran.

and a polyamide imine having an inherent viscosity of 0.92 was obtained. The polymer was dissolved in dimethylformamide to a concentration of 33% at room temperature. The solution was spun into an air bath of 130° C. through a spinneret of 0.2 mm. in diameter, and the resultant filaments were wound at a draft ratio of 3×. Thus obtained filament had a denier of 14.4, a strength of 1.19 g./d., and an elongation of 61%.

EXAMPLE 107

A polyamide imine having an inherent viscosity of 0.64 which was prepared as in the first part of Example 105 was dissolved in ε-caprolactam at 90° C., and a solution of 20% polymer concentration was obtained.

EXAMPLES 108–111

From the polyamide imines prepared as in the first part of Example 105, mouldable polymer solutions of the compositions as specified in Table 18 were obtained.

TABLE 18

| Ex. No. | Inherent viscosity of polymer ($\eta_{inh}$) | Polymer concentration (percent) | Solvent composition Type | Composition ratio (percent) |
|---|---|---|---|---|
| 108 | 0.79 | 45 | N-Methyl-2-pyrrolidone | 100 |
| 109 | 0.47 | 30 | Dimethylformamide | 60 |
|     |      |    | Acetone | 40 |
| 110 | 0.51 | 30 | Dimethylformamide | 60 |
|     |      |    | Methylene chloride | 40 |
| 111 | 0.50 | 25 | Dimethylsulfoxide | 100 |

EXAMPLE 112

Dimethylformamide or dimethylacetamide solutions of 15–40% polymer concentrations were prepared, using the polyamide imine copolymers synthesized in the foregoing examples. The solutions were shaped into films of 25–90μ in thickness in accordance with the method of film formation described in the latter half of Example 105. The strength and elongation of the resultant films are given in Table 19.

TABLE 19

| Run No. | Polyamide imine copolymer Example No.[1] | Inherent viscosity of copolymer ($\eta_{inh}$) | Film properties Strength (kg./cm.²) | Elongation (percent) |
|---|---|---|---|---|
| 1 | 29 | 0.72 | 520 | 15 |
| 2 | 33 | 0.82 | 620 | 21 |
| 3 | 32 | 0.78 | 630 | 25 |
| 4 | 30 | 0.74 | 550 | 25 |
| 5 | 87 | 0.70 | 680 | 29 |
| 6 | 88 | 0.54 | 710 | 14 |
| 7 | 89 | 0.53 | 760 | 6 |
| 8 | 90 | 1.80 | 990 | 23 |
| 9 | 91 | 1.52 | 960 | 19 |
| 10 | 92 | 1.22 | 950 | 17 |
| 11 | 97 | 1.26 | 820 | 22 |
| 12 | 98 | 1.11 | 890 | 27 |
| 13 | 99 | 1.02 | 980 | 14 |
| 14 | 100 | 0.85 | 830 | 24 |
| 15 | 101 | 0.93 | 1,010 | 15 |
| 16 | 93 | 1.06 | 910 | 23 |
| 17 | 102 | 0.71 | 760 | 19 |
| 18 | 94 | 0.73 | 810 | 16 |
| 19 | 27 | 0.78 | 1,030 | 13 |
| 20 | 34 | 0.60 | 850 | 7 |
| 21 | 36 | 0.44 | 750 | 8 |
| 22 | 35 | 1.21 | 840 | 14 |
| 23 | 37 | 0.44 | 950 | 6 |

[1] Example No. refers to that by which the specific copolymer was prepared.

EXAMPLE 113

The polyamide imine having an inherent viscosity of 0.79 which was prepared in Example 4 was dissolved in N-methyl-pyrrolidone at room temperature, to a concentration of 20%. The solution was shaped into a polyamide imine film of 33μ in thickness, in accordance with the film-forming procedure described in Example 105. The resultant film had a strength of 840 kg./cm.² and an elongation of 15%.

EXAMPLE 114

The polymer solution obtained in Example 105 was daubed onto a steel sheet and dried at 250° C. for 40 minutes. Thus excellent coating was obtained. The volume resistivity of the coating was $1.53 \times 10^{15}$Ω-cm. at 30° C., and as high as $4.21 \times 10^{13}$Ω-cm. even at 200° C. Thus excellent electrical insulation property was confirmed.

EXAMPLE 115

From the N-methyl-2-pyrrolidone solution of polyamide imine obtained in Example 7, a strong, yellowish brown film was obtained by dry process.

The film was heated at 360° C. for 3 hours in vacuum to cause cyclo-dehydration. Thus treated film showed little change in appearance, except that it became plastic and its color was somewhat lightened. The film had an inherent viscosity in formic acid of 2.36. The infrared absorption spectrum and solubility of the film coincided with those of polybenzimidazole obtained by the procedures described in the latter half of Example 4, indicating the substantially complete conversion by the heating.

When the same film was heat treated at 310° C. for 6.5 hours, the infrared absorption spectrum showed a slight but clear absorption band by —CONH— group at 1660 cm.$^{-1}$. Thus the ring closure was still incomplete.

EXAMPLE 116

2,4-diaminodiphenylamine and terephthaloyl chloride were polymerized generally in accordance with Example 2, and a polyamide imine having an inherent viscosity of 0.57 was obtained. The powdery polymer was heated and cyclized at 290° C. for 3 hours in nitrogen current. The resultant polyamidebenzimidazole had an inherent viscosity of 1.35 in dimethylformamide. The polymer's infrared absorption spectrum, solubility, thermal properties, etc. perfectly corresponded with those of the product of latter half of Example 2.

EXAMPLE 117

The various polyamide imines obtained in the foregoing examples as specified in Table 20 were heated and cyclized in the form of film and/or powder. The results are also given in Table 20. In all cases the absorption bands by amide group was decreased in the infrared absorption spectra, and the absorptions at 1350 cm.$^{-1}$, 970 cm.$^{-1}$, 770 cm.$^{-1}$ which are characteristic to polyamidebenzimidazole clearly appeared. Thus sufficient progress of ring closure was confirmed.

TABLE 20

| Run No. | Polyamide imines Example No. | $\eta_{inh}$ | Reaction Conditions Temp. (°C.) | Time (hrs.) | Atmosphere | Polybenzimidazoles $\eta_{inh}$ | Solubility |
|---|---|---|---|---|---|---|---|
| 1 | 29 | 0.72 | 290 | 4 | Vacuum | 0.92 | A, B, C, D, E. |
| 2 | 33 | 0.82 | 295 | 4 | do | 1.56 | A, B, C, D, E. |
| 3 | 32 | 0.78 | 295 | 3.5 | do | 1.22 | A, B, C, D, E. |
| 4 | 30 | 0.74 | 295 | 3.5 | do | 0.98 | A, B, C, D, E. |
| 5 | 87 | 0.70 | 295 | 3.5 | do | 0.94 | A, B, C, D, E. |
| 6 | 88 | 0.54 | 290 | 4 | do | 0.59 | A, B, C, D, E. |
| 7 | 89 | 0.53 | 290 | 4 | do | 0.65 | A, B, C, D, E. |
| 8 | 90 | 1.80 | 300 | 3.5 | do | 3.74 | A, B, D, E. |
| 9 | 91 | 1.52 | 300 | 3.5 | do | 2.64 | A, B, D, E. |
| 10 | 92 | 1.22 | 300 | 3.5 | N₂ gas | 2.44 | A, B, D, E. |
| 11 | 97 | 1.26 | 300 | 3.5 | do | 1.70 | A, B, C, D, E. |
| 12 | 98 | 1.11 | 300 | 3.5 | do | 1.41 | A, B, D, E. |
| 13 | 99 | 1.02 | 290 | 4 | do | 1.27 | A, B, D, E. |
| 14 | 100 | 0.85 | 290 | 4 | do | 1.61 | A, B, E. |
| 15 | 101 | 0.93 | 290 | 4 | do | 2.06 | A, B, E. |
| 16 | 93 | 1.06 | 290 | 4 | Vacuum | 2.42 | A, B, D, E. |
| 17 | 102 | 0.71 | 290 | 4 | do | ¹2.96 | B, C. |
| 18 | 94 | 0.73 | 290 | 4 | do | 1.33 | A, B, D, E. |
| 19 | 27 | 0.78 | 390 | 4 | do | 2.08 | A, E. |
| 20 | 34 | 0.60 | 290 | 4 | do | ¹1.45 | B. |
| 21 | 36 | 0.44 | 290 | 4 | do | 1.65 | A, E. |
| 22 | 35 | 1.21 | 290 | 4 | do | 2.80 | D. |
| 23 | 37 | 0.44 | 290 | 4 | do | 0.79 | A, B, C, D, E. |

¹ Formic acid.

NOTE.—A = Soluble in amide solvents; B = Soluble in formic acid; C = Soluble in dichloroacetic acid; D = Soluble in m-cresol; E = Soluble in dimethylsulfoxide.

EXAMPLE 118

0.8 gram of the polyamide imine obtained in the first part of Example 4 was dissolved by heating in 25 g. of polyphosphoric acid (total $P_2O_5$ content: 84%) in a three-necked flask of 50 ml. capacity equipped with a sealed stirrer and calcium chloride cylinder. The solution was further heated at 120–130° C. for 2 hours under stirring. Thereafter the reaction mixture was transferred into approximately 0.5 l. of cold water to be separated of the polymer. The polymer was thoroughly washed with water and aqueous sodium carbonate, followed by filtration and drying. The inherent viscosity of 0.5% formic acid solution of the polymer was 1.99. The solubility, infrared absorption spectrum and thermal properties, etc. of the polymer perfectly corresponded with those of the polybenzimidazole obtained in the last part of Example 4.

EXAMPLE 119

One gram of the polyamide imine which was obtained in the first part of Example 2 was reacted at 130° C. for 4 hours in 25 g. of polyphosphoric acid (total $P_2O_5$ content: 84%). A yellow polyamidebenzimidazole was obtained. A 0.5% dimethylsulfoxide solution of the polymer had an inherent viscosity of 0.56. The solubility, infrared absorption spectrum, and thermal properties, etc. of the polymer corresponded with those of the polyamidebenzimidazole obtained in the last part of Example 2.

EXAMPLE 120

Reacting 2,4-diaminodiphenylamine with terephthaloyl chloride under the same conditions as employed in Example 1, a N-methyl-2-pyrrolidone solution of polyamide imine containing hydrochloric acid was obtained. From a portion of the reaction liquid the polymer was separated and measured of the inherent viscosity, which was 0.40.

The solution was gradually heated under stirring, and whereby subjected to a cyclization reaction at 150° C. for 4 hours. The polymer separated from the reaction system thereafter showed an inherent viscosity of 1.10. The product's conversion to polyamidebenzimidazole was confirmed by means of infrared absorption analysis.

EXAMPLE 121

Two grams of the polyamide imine copolymer powder obtained in Example 102 was mixed with 20 ml. of formic acid. The copolymer was not dissolved in the formic acid but remained as suspended, at room temperature. The suspension was heated to 100° C. under stirring, and maintained at that temperature for 5 minutes. One or two minutes after the heating was started, the copolymer was homogeneously dissolved in formic acid. With the increase in viscosity of the solution, the system changed from reddish purple to yellowish brown in color. The solution then was shaped into film by dry process. The infrared absorption analysis of the film confirmed the conversion of the copolymer to polyamidebenzimidazole.

For comparison, a dimethylformamide solution of the same polyamide imine was heated at 100° C. for 2 hours and shaped into a film. In that case, however, the copolymer retained the polyamide imine structure.

EXAMPLE 122

To the 20% dimethylformamide solution of the polyamide imine copolymer obtained in Example 99, 5% by volume of p-toluenesulfonic acid based on the copolymer was added. The system was then spread on a glass sheet and heated at 150° C. for 4 hours. The infrared absorption spectrum of thus obtained light yellow film clearly showed the characteristic absorption band of benzimidazole ring, indicating that the copolymer was converted to polyamidebenzimidazole.

EXAMPLE 123

One gram of the polyamide imine having an inherent viscosity of 0.60, which was obtained in Example 34, was dissolved in 10 ml. of a mixed solvent consisting of 90% of dimethylformamide and 10% of formic acid at room temperature. The solution was then heated at 100° C. for 5 minutes. The polymer separated from thus obtained polymeric solution had an inherent viscosity of 1.45 as a 0.5% formic acid solution. Conversion of the polyamide imine to polyamidebenzimidazole was confirmed by infrared absorption analysis.

Similar procedures were repeated with the use of a mixed solvent consisting of 90% of dimethylformamide and 10% of dichloroacetic acid. The resultant polymer was confirmed to have been converted to polyamidebenzimidazole, similarly to the case above.

EXAMPLES 124 AND 125

Effect of hot water treatment of polyamide imine:

Under the reaction conditions of Example 2 in which polyamide imine was synthesized in tetrahydrofuran (THF) solvent, and those of Example 28 in which polyamide imine was synthesized in methyl ethyl ketone (MEK), respectively, two polyamide imines were prepared from 2,4-diaminodiphenylamine and terephthaloyl chloride. The products were treated with cold water, and portions thereof were dried without further processing.

The remaining portions were heated in hot water for a predetermined period, and dried. The samples showed no difference in inherent viscosities and infrared absorption spectra. However, when they were simultaneously heated at 300° C. for 3.5 hours in vacuum to be converted to polyamidebenzimidazole and thereafter formed into 7% N-methylpyrrolidone solutions, the properly hot water-treated polymer samples gave transparent, homogenous solutions. Whereas, the samples which were not treated with hot water partially left gelled, insoluble matter. The correlation of treating conditions with hot water and the state of polymer solutions after the ring closure is given in Table 21. Note that the hot water treatment was performed at the ratio of 50 parts of hot water per part of polyamide imine.

TABLE 21

| Ex. No. | Polyamide imine | | Hot water treatment | | |
|---|---|---|---|---|---|
| | Polymerization condition (reaction solvent) | $\eta_{inh}$ | Temp. (° C.) | Time (hrs.) | Solution of polyamidebenzimidazole |
| 124-A | THF-water | 0.49 | Untreated | | Partially gelled. |
| 124-B | | | 40 | 3 | Do. |
| 124-C | | | 75 | 3 | Smooth and transparent. |
| 124-D | | | 90 | 2 | Do. |
| 124-E | | | 100 | 2 | Do. |
| 125-A | MEK-water | 1.15 | Untreated | | Partially gelled. |
| 125-B | | | 100 | 2 | Smooth and transparent. |
| 125-C | | | 100 | 3 | Do. |

EXAMPLE 126

A polyamide imine having an inherent viscosity of 0.74 was prepared from 2,4-diaminodiphenylamine and terephthaloyl dichloride in accordance with Example 2. The product was heated in vacuum at 300–310° C. for 3 hours, to be converted to polyamidebenzimidazole having an inherent viscosity of 1.90. According to infrared absorption analysis, the ring closure advanced to not less than 90%.

The polyamidebenzimidazole was dissolved in N-methyl-2-pyrrolidone to a concentration of 15%. The solution was extremelyl viscous, as indicated by the falling-ball rate of 334 seconds. The solution was spread on a glass sheet to a thickness of 330$\mu$, and dried for 2 hours at 80° C. in nitrogen current, and for subsequent 10 hours at 130° C. under reduced pressure. Thus light yellow, transparent film was obtained.

The film had a thickness of 40$\mu$, specific gravity of 1.2730, strength of 1360 kg./cm.$^2$, and an elongation of 26%. Also the film showed self-extinguishing property when ignited.

EXAMPLE 127

A polyamide imine having an inherent viscosity of 0.69, which was prepared as in the first part of Example 126, was heated in vacuum at 310° C. for 3 hours, to be converted to a polyamidebenzimidazole in which the ring closure ratio was no less than 90%. The polyamidebenzimidazole had an inherent viscosity of 1.67. It was than dissolved in N-methyl-2-pyrrolidone to a concentration of 15%. The resultant solution was spread on a glass sheet to a thickness of 250$\mu$, and dried in the air at 90° C. for 1.5 hours, and for subsequent 8 hours at 100° C. under reduced pressure. Thus light yellow, transparent film was obtained, which had a thickness of 35$\mu$, strength and elongation at room temperature of 1010 kg./cm.$^2$ and 20%; those at 200° C. of 660 kg./cm.$^2$ and 38%; and those at 250° C. of 580 kg./cm.$^2$ and 38%. Whereas, when the film was drawn by 1.3✕ at 250° C., the product showed a strength and elongation at room temperature of 1060 kg./cm.$^2$ and 3.3%, and those at 250° C. of 760 kg./cm.$^2$ and 10%. Thus its strength retention at 250° C. was 72%, which is a very favorable value for a heat-stable polymer.

EXAMPLE 128

A polyamidebenzimidazole having an inherent viscosity of 1.54 which was prepared as in the first part of Example 126 was dissolved in N-methyl-2-pyrrolidone, and a solution having a polymer concentration of 25% was obtained. The solution was spun into an air bath of 160° C. through a spinneret of 0.2 mm. in diameter, and the filaments formed was wound with a draft ratio of 4✕. The resultant filament had a denier of 13.6, strength of 1.31 g./d., and elongation of 39%. When the filament was drawn by 1.5✕ at 250° C., the strength and elongation became, respectively, 2.14 g./d. and 34%.

EXAMPLE 129

The polyamide imine having an inherent viscosity of 0.58 as obtained in the experiments of Table 10 was heated at 300° C. for 3 hours in nitrogen current, and converted to polyamidebenzimidazole having an inherent viscosity of 1.3.

A 20% N-methyl-2-pyrrolidone solution of the polyamidebenzimidazole was daubed on a steel sheet and dried at 250° C. for 40 minutes. Thus an excellent coating was obtained. The volume resistivity of the coating was 9.22✕10$^{14}$ Ω-cm. at 30° C. and 3.21✕10$^{13}$ Ω-cm. at 200° C. Thus the coating was proven to have an excellent electrical insulation property.

The same polymer solution was also formed into film in accordance with the film-forming procedure described in Example 126. The film had a strength of 1160 kg./cm.$^2$ at room temperature. When it was let stand in the air at 250° C. for a week and thereafter measured of its strength again at normal temperature, the strength was 1040 kg./cm.$^2$ After 2 days' standing at 300° C., the sample had a strength of 1050 kg./cm.$^2$ In both cases the strength retention was approximately 90%. Thus the excellent heat stability of the polymer was confirmed.

EXAMPLE 130

The polyamidebenzimidazole of run No. 4 of Example 117 was dissolved in a mixed solvent consisting of 2 parts of N-methyl-2-pyrrolidone and 1 part of N,N-dimethylacetamide, and a solution having a polymer concentration of 14% was prepared. The solution was daubed on a copper sheet, dried and baked into a flexible, excellent coating. Also when the solution was daubed onto a glass rod, dried and heated in reducing flame of a gas burner, no peeling or separation of the coating was observed, indicating good adherability of the polymer to glass. A film prepared from this polymer had a strength of 705 kg./cm.$^2$ and elongation of 29% at room temperature.

EXAMPLE 131

From the polyamidebenzimidazole prepared in the manner similar to the first part of Example 126, mouldable polymer solutions of the compositions as given in Table 22 were prepared.

TABLE 22

| Run No. | Inherent viscosity of polymer ($\eta_{inh}$) | Polymer concentration (percent) | Solvent composition | |
|---|---|---|---|---|
| | | | Type | Composition ratio (percent) |
| 1 | 0.70 | 20 | {N-methyl-2-pyrrolidone<br>{Methylene dichloride | 75<br>25 |
| 2 | 1.30 | 15 | {N-methyl-2-pyrrolidone<br>{Toluene | 75<br>25 |
| 3 | 0.65 | 15 | {N,N-dimethyl acetamide<br>{Ethyl acetate | 75<br>25 |
| 4 | 1.30 | $^1$5 | ε-Caprolactam | 100 |

$^1$ At 150° C.

EXAMPLE 132

The polyamide imine having an inherent viscosity of 0.89, which was prepared from 2,4-diaminodiphenylamine and terephthaloyl chloride in accordance with Example 2, was shaped into a film of 50$\mu$ in thickness, in the manner described in Example 129.

The film was heat-treated at 305° C. for 6 hours in nitrogen current, and converted to polyamidebenzimidazole film. The strength and elongation of the film were measured at various temperatures, and compared with those of the preceding polyamide imine film. The results are given in Table 23. From the data obtained, it can be understood that the polyamidebenzimidazole conversion conspicuously improved the heat stability of the film.

TABLE 23

| Measured temp. (° C.) | Film Properties | | | |
|---|---|---|---|---|
| | Before heat treatment | | After heat treatment | |
| | Strength (kg./cm.$^2$) | Elongation (percent) | Strength (kg./cm.$^2$) | Elongation (percent) |
| 25 | 630 | 7.8 | 912 | 11.7 |
| 200 | 306 | 23 | 575 | 9.0 |
| 250 | 240 | 36 | 470 | 6.5 |

EXAMPLE 133

The ring closure ratio in the polyamidebenzimidazole obtained in run No. 17 of Example 117 was roughly estimated to be 80%, by means of comparison of intensities of characteristic absorptions observed in infrared absorption spectra. The polymer was dissolved in formic acid to a concentration of 15%, and formed into a film of 30μ in thickness on a glass sheet. The film had a strength of 750 kg./cm.$^2$, and an elongation of 18%.

We claim:

1. Film forming aromatic polyamide imines in which at least 75 mol percent of the entire structural unit is composed of at least one aromatic amide imine structural unit expressed by the following formula

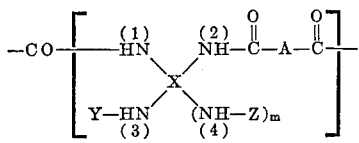

wherein X is a trivalent or tetravalent aromatic group; Y and Z are the same or different and represent a monovalent aromatic group; with the proviso that (i) group (3) is bonded to a nuclear carbon atom of X adjacent that to which group (1) or (2) is bonded;
(ii) group (4) is bonded to a nuclear carbon atom of X adjacent that to which group (1) or (2) is bonded;
(iii) groups (3) and (4) are not bonded on adjacent carbon atoms of X;
(iv) groups (1) and (2) are not bonded on adjacent carbon atoms of X;
(v) group (3) or group (4) is not bonded to a nuclear carbon atom of X interposed between those nuclear carbon atoms to which groups (1) and (2) are bonded so as to form three consecutive nuclearly bonded groups;

A is a divalent aromatic group; and m is 0 or 1, and when m is 0, ⟨NH—Z⟩$_m$ represents a hydrogen atom which may be substituted with a halogen atom or a non-reactive atomic group.

2. Film forming aromatic polyamide imines consisting of the structural unit expressed by the following formula

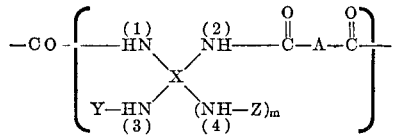

wherein X is a trivalent or tetravalent aromatic hydrocarbon residue selected from the group consisting of a benzene nucleus, biphenyl nucleus, naphthalene nucleus and an atomic group of the formula

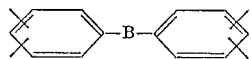

wherein B represents an alkylene group having 1–3 carbon atoms,

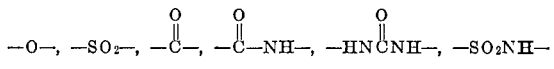

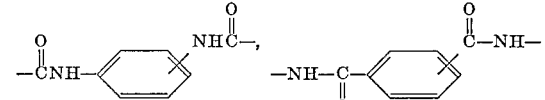

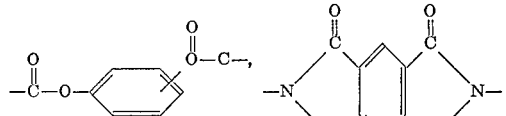

or

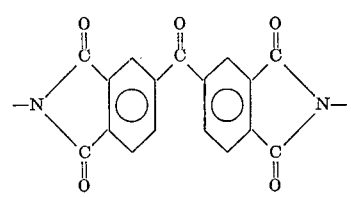

Y and Z may be the same or different and represent a monovalent unsubstituted aromatic group optionally having non-reactive substituents selected from the group consisting of halogen atoms or alkyl groups; A is a divalent aromatic group; with the proviso that (i) group (3) is bonded to a nuclear carbon atom of X adjacent that to which group (1) or (2) is bonded;
(ii) group (4) is bonded to a nuclear carbon atom of X adjacent that to which group (1) or (2) is bonded;
(iii) groups (3) and (4) are not bonded on adjacent carbon atoms of X;
(iv) groups (1) and (2) are not bonded on adjacent carbon atoms of X;
(v) group (3) or group (4) is not bonded to a nuclear carbon atom of X interposed between those nuclear carbon atoms to which groups (1) and (2) are bonded so as to form three consecutive nuclearly bonded groups;

and m is 0 or 1, and when m is 0, the said group

⟨NH—Z⟩$_m$ represents a hydrogen atom, and inclusive of a case of m being 0, 1–3 hydrogen atoms of the aromatic group (X) may be substituted with a halogen atom or a methyl group.

3. Film forming aromatic polyamide imines consisting of at least 75 mol percent of a structural unit expressed by the formula

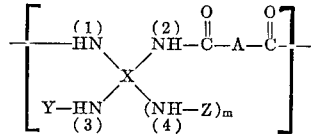

wherein X is a trivalent or tetravalent aromatic hydrocarbon residue selected from the group consisting of a benzene nucleus, biphenyl nucleus, naphthalene nucleus and an atomic group of the formula

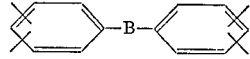

in which B is an alkylene group of 1–3 carbon atoms,

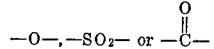

Y and Z may be the same or different and represent a monovalent aromatic group optionally having non-reactive substituents selected from the group consisting of halogen atoms and alkyl groups; A is at least one divalent aromatic group; with the proviso that
  (i) group (3) is bonded to a nuclear carbon atom of X adjacent that to which group (1) or (2) is bonded;
  (ii) group (4) is bonded to a nuclear carbon atom of X adjacent that to which group (1) or (2) is bonded;
  (iii) groups (3) and (4) are not bonded on adjacent carbon atoms of X;
  (iv) groups (1) and (2) are not bonded on adjacent carbon atoms of X;
  (v) group (3) or group (4) is not bonded to a nuclear carbon atom of X interposed between those nuclear carbon atoms to which groups (1) and (2) are bonded so as to form three consecutive nuclearly bonded groups;

and $m$ is 0 or 1, and when $m$ is 0, the said group $\text{-(NH-Z)}_m$ represents a hydrogen atom, and inclusive of a case of $m$ being 0, 1–3 hydrogen atoms of the aromatic group (X) may be substituted with a halogen atom or a methyl group; and up to 25 mol percent of a structural unit expressed by the following formula $$\left[ -N-Q-N-\overset{O}{\underset{}{C}}-A-\overset{O}{\underset{}{C}}- \right]$$
$$\phantom{xx}R' \phantom{xx} R''$$

wherein Q is a divalent aromatic group;

$$-\underset{R'}{N}- \text{ and } -\underset{R''}{N}-$$

are bonded to nulear carbon atoms at positions other than adjacent positions of the aromatic group Q; R' and R'' may be the same or different and represent an alkyl group having 1–3 carbon atoms or a hydrogen atom; A is a divalent aromatic group; and the two $$-\overset{O}{\underset{}{C}}-$$

groups are bonded to nuclear carbon atoms at positions other than adjacent positions of the aromatic group A.

4. Film forming aromatic polyamide imines consisting of 75–100 mol percent of a structural unit expressed by the following formula wherein $m$ is 0 to 1, and when $m$ is 0, represents a hydrogen atom which may be substituted with a halogen atom or a non-reactive atomic group; the two $$-\overset{O}{\underset{}{C}}-$$

groups are bonded at positions para or meta to each other on the benzene nucleus; $n$ is 0–2; and $\alpha$ and $\beta$ may be the same or different and represent a halogen atom or a methyl group, and 0–25 mol percent of a structural unit expressed by the following formula wherein Q' represents a phenylene group, biphenylene group, naphthylene group or a group of the formula in which B' denotes an alkylene group having 1–3 carbon atoms, $$-O-, -S-, -SO_2-, \text{ or } -\overset{O}{\underset{}{C}}-$$

$R_1$ and $R_2$ may be the same or different and represent a hydrogen atom or a methyl group; and $-NR_1-$ and $NR_2-$ are bonded to nuclear carbon atoms at positions other than adjacent positions of the aromatic nucleus Q'.

5. Fiber forming polyamidebenzimidazoles consisting of
  (A) at least 50 mol percent of a structural unit of the following general formula wherein A is at least one divalent aromatic group, $$\underset{-N}{\overset{-N}{\diagdown}}C- \text{ and } -\overset{O}{\underset{}{C}}-$$

are bonded to nuclear carbon atoms at positions other than adjacent positions of the aromatic group A; $n$ is 0–2; and $\alpha$ represents a halogen atom or a non-reactive atomic group;
  (B) 0–25 mol percent of a structural unit expressed by the following formula $$\left[ -N-Q'-N-\overset{O}{\underset{}{C}}-A-\overset{O}{\underset{}{C}}- \right]$$
$$\phantom{xx}R_1 \phantom{xx} R_2$$

wherein Q' represents a phenylene group, biphenylene group, naphthylene group or a group in which B' is an alkylene group having 1–3 carbon atoms, $$-O-, -S-, -SO_2- \text{ or } -\overset{O}{\underset{}{C}}-$$

$R_1$ and $R_2$ may be the same or different and represent a hydrogen atom or a methyl group; $-NR_1-$ and $-NR_2-$ are bonded to nuclear carbon atoms at positions other than adjacent positions of the aromatic nucleus Q'; and A is as defined above; and
  (C) the remainder being a structural unit expressed by the general formula wherein A, $\alpha$, and $n$ are as defined above.

6. A process for the preparation of aromatic polyamide imines, which comprises reacting (A) at least one aromatic triamine or tetramine expressed by the following formula

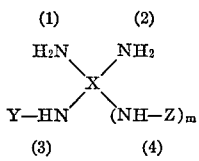

wherein X is a trivalent or tetravalent aromatic group; Y and Z are the same or different and represent a monovalent aromatic group; with the proviso that
(i) group (3) is bonded to a nuclear carbon atom of X adjacent that to which group (1) or (2) is bonded;
(ii) group (4) is bonded to a nuclear carbon atom of X adjacent that to which group (1) or (2) is bonded;
(iii) groups (3) and (4) are not bonded on adjacent carbon atoms of X;
(iv) groups (1) and (2) are not bonded on adjacent carbon atoms of X;
(v) group (3) or group (4) is not bonded to a nuclear carbon atom of X interposed between those nuclear carbon atoms to which groups (1) and (2) are bonded so as to form three consecutive nuclearly bonded groups;

and $m$ is 0 or 1, and when $m$ is 0, $(NH-Z)_m$ is a hydrogen atom which may be substituted with a halogen atom or a non-reactive atomic group, or (B) a mixture of at least 75 mol percent of the said aromatic triamine or tetramine with less than 25 mol percent of an aromatic diamine having primary amino groups and/or monoalkyl-substituted amino groups which are attached to nuclear carbon atoms at positions other than adjacent positions, with (C) at least one aromatic dicarboxylic acid dihalide expressed by the general formula $$HalOC-A-COHal$$

wherein Hal is a halogen atom, A is a divalent aromatic group, and two COHal groups should not be at adjacent positions to the aromatic nucleus of A, at a temperature of $-20°$ C. to $50°$ C. in an inert organic liquid medium in the presence of an acid acceptor.

7. The process for the preparation of aromatic polyamide imines according to claim 6 wherein a mixture of (A) 75–100 mol percent of 2,4-diaminodiphenyl amine of the general formula

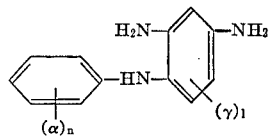

wherein $n$ and $l$ denote an integer of 0–2, and $\alpha$ and $\gamma$ represent a halogen atom and/or methyl group, with (B) less than 25 mol percent of an aromatic diamine having primary amino groups and/or monoalkyl-substituted amino groups having 3 or less carbon atoms wherein the amino groups are bonded to nuclear carbon atoms at positions other than adjacent positions of the aromatic nucleus, is reacted with (C) terephthaloyl chloride and/or isophthaloyl chloride in the presence of methyl ethyl ketone and an aqueous solution of an inorganic acid acceptor or in the presence of acetone and an aqueous solution of an inorganic acid acceptor and a neutral salt.

8. A process for the preparation of N-aryl substituted polybenzimidazoles, which comprises heating a polyamide imine in which at least 75 mol percent of the entire structural unit consists of at least one aromatic amide imine structural unit of the following formula

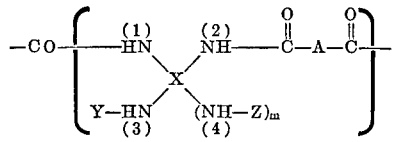

wherein X is a trivalent or tetravalent aromatic group; Y and Z are the same or different and represent a monovalent aromatic group; with the proviso that
(i) group (3) is bonded to a nuclear carbon atom of X adjacent that to which group (1) or (2) is bonded;
(ii) group (4) is bonded to a nuclear carbon atom of X adjacent that to which group (1) or (2) is bonded;
(iii) groups (3) and (4) are not bonded on adjacent carbon atoms of X;
(iv) groups (1) and (2) are not bonded on adjacent carbon atoms of X;
(v) group (3) or group (4) is not bonded to a nuclear carbon atoms of X interposed between those nuclear carbon atoms to which groups (1) and (2) are bonded so as to form three consecutive nuclearly bonded groups;

and $m$ is 0 or 1, and when $m$ is 0, $(NH-Z)_m$ represents a halogen atom which may be substituted with a halogen atom or a non-reactive atomic group, at a temperature of not less than $200°$ C. but below the decomposition temperature of the polybenzimidazole, or at a temperature of not less than $60°$ C. but below the decomposition temperature of the polybenzimidazole when an acid substance is present, whereby at least 50 mol percent of the aromatic amide imine structural unit is cyclodehydrated and converted into an N-aryl substituted benzimidazole structure of the following formula

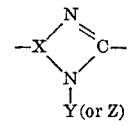

wherein X, Y and Z are as defined above.

9. The process for the preparation of polyamide imines according to claim 6 wherein said reaction is carried out in an additional presence of a reactive monofunctional compound as a molecular weight regulating agent selected from the group consisting of aromatic monoamines and aromatic monocarboxylic acid chlorides.

10. The process of claim 6 wherein the polyamide imines are further treated with hot water.

11. Polymer solutions for shaping purposes consisting of solutions in organic solvents of the polyamide imines according to claim 1.

12. Shaped articles comprising the polyamide imines according to claim 1.

13. Polymer solutions for shaping purposes consisting of solution in organic solvents of the polyamide benzimidazoles according to claim 5.

14. Shaped articles comprising the polyamide benzimidazoles according to claim 5.

References Cited

UNITED STATES PATENTS 2,895,948   7/1959   Brinker et al.
3,313,783   4/1967   Iwakura et al. _____ 260—78

OTHER REFERENCES

Journal of Polymer Science, vol. 50, pp. 511–539, 1961, Vogel et al.

New Linear Polymers, November 1967, Lee et al., pp. 269 and 302.

WILLIAM H. SHORT, Primary Examiner

H. SCHAIN, Assistant Examiner

U.S. Cl. X.R.

117—128.4, 132, 161; 260—30.2, 30.4, 30.6, 30.8, 31.2, 32.4, 32.6, 32,8, 33.4, 33.6, 47, 65, 78.4; 264—331